(12) United States Patent
Takahashi et al.

(10) Patent No.: US 8,307,455 B2
(45) Date of Patent: Nov. 6, 2012

(54) DECRYPTION-KEY DISTRIBUTION METHOD AND AUTHENTICATION APPARATUS

(75) Inventors: Yosuke Takahashi, Yokohama (JP); Shiro Mazawa, Fujisawa (JP); Akihiko Yoshida, Yokohama (JP); Daigo Takayanagi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/044,646

(22) Filed: Mar. 10, 2011

(65) Prior Publication Data

US 2011/0167264 A1  Jul. 7, 2011

Related U.S. Application Data

(63) Continuation of application No. 11/455,178, filed on Jun. 2, 2006, now abandoned.

(30) Foreign Application Priority Data

Jun. 6, 2005 (JP) ................................ 2005-165685

(51) Int. Cl.
| | |
|---|---|
| G06F 7/04 | (2006.01) |
| G06F 17/30 | (2006.01) |
| G06F 21/00 | (2006.01) |
| H04N 7/16 | (2006.01) |
| H04K 1/00 | (2006.01) |
| H04L 9/08 | (2006.01) |

(52) U.S. Cl. ............ 726/27; 380/270; 380/278; 705/51; 705/57

(58) Field of Classification Search ................. 380/270, 380/278; 726/27; 705/51–59
See application file for complete search history.

(56) References Cited

U.S. PATENT DOCUMENTS

| | | | | |
|---|---|---|---|---|
| 7,194,763 | B2 * | 3/2007 | Potter et al. ....................... | 726/7 |
| 7,240,365 | B2 | 7/2007 | de Jong et al. | |
| 7,398,557 | B2 | 7/2008 | de Jong | |
| 7,418,596 | B1 * | 8/2008 | Carroll et al. ................. | 713/169 |
| 7,529,933 | B2 * | 5/2009 | Palekar et al. ................ | 713/168 |
| 7,533,257 | B2 * | 5/2009 | Lee et al. ...................... | 713/155 |

(Continued)

FOREIGN PATENT DOCUMENTS

JP  2003-229844  8/2003

(Continued)

OTHER PUBLICATIONS

3GPP2X.S0022-0 Version 1.0, Dec. 2004, "Broadcast and Multicast Service in cdma2000 Wireless IP Network".

(Continued)

*Primary Examiner* — Christian Laforgia
(74) *Attorney, Agent, or Firm* — Brundidge & Stanger, P.C.

(57) ABSTRACT

A decryption key for decrypting data from an access node is distributed to an access terminal intending to receive the data. An authentication unit receives a message for terminal authentication including a terminal identifier from the terminal and authenticates the terminal. The authentication unit refers to a content registration table having stored in advance the content type of a content which the terminal can receive, in association with the terminal identifier, according to the received terminal identifier to obtain a corresponding content type. The authentication unit refers to a decryption data base having stored in advance a decryption key and its valid period in association with a content type, according to the obtained content type to obtain a corresponding decryption key and valid period. The authentication unit sends an authentication result and the decryption key and valid period to the terminal or to a packet control unit.

10 Claims, 24 Drawing Sheets

U.S. PATENT DOCUMENTS

| | | | |
|---|---|---|---|
| 7,590,856 B2 | 9/2009 | Morino et al. | |
| 7,870,389 B1 * | 1/2011 | Leung et al. | 713/168 |
| 7,921,290 B2 * | 4/2011 | Albert et al. | 713/168 |
| 7,930,412 B2 * | 4/2011 | Yeap et al. | 709/229 |
| 2003/0226017 A1 * | 12/2003 | Palekar et al. | 713/168 |
| 2003/0236982 A1 * | 12/2003 | Hsu | 713/171 |
| 2004/0093522 A1 * | 5/2004 | Bruestle et al. | 713/201 |
| 2005/0033967 A1 | 2/2005 | Morino et al. | |
| 2005/0044016 A1 | 2/2005 | Irwin et al. | |
| 2005/0071280 A1 | 3/2005 | Irwin et al. | |
| 2006/0002351 A1 * | 1/2006 | Madour | 370/338 |
| 2006/0021062 A1 | 1/2006 | Jang | |
| 2006/0149683 A1 | 7/2006 | Shimojima et al. | |
| 2007/0264965 A1 * | 11/2007 | Taniguchi | 455/403 |

FOREIGN PATENT DOCUMENTS

JP    2004-112210    4/2004

OTHER PUBLICATIONS

3GPP2 C.S0005-D Version 1.0, Feb. 2004, "Upper Layer (Layer 3) Signaling Standard for cdma2000 Spread Spectrum Systems", Release D.

3GPP2 C.S0054-0, Version 1.0, Feb. 2004, CDMA2000 High Rate Broadcast-Multicast Packet Data Air Interface Specification.

Network Working Group RFC:1662, "PPP in HDLC-Like Framing" Jul. 1994, W. Simpson.

\* cited by examiner

| 7 | 6 | 5 | 4 | 3 | 2 | 1 | 0 | Octet | |
|---|---|---|---|---|---|---|---|---|---|
| ⇒ Code = [02H] | | | | | | | | 1 | 2201 |
| ⇒ Identifier = [any value] | | | | | | | | 1 | 2202 |
| (MSB) | ⇒ Length = [variable] | | | | | | | 1 | 2203 |
| | | | | | | | (LSB) | 2 | |
| (MSB) | ⇒ Response Authenticator = [any value] | | | | | | | 1 | |
| | | | | | | | | 2 | 2204 |
| | | | ... | | | | | ... | |
| | | | | | | | (LSB) | 16 | |
| ⇒ Decryption Key (Vendor-Specific) = [1AH] | | | | | | | | 1 | 2205 |
| Length = [variable] | | | | | | | | 2 | |
| (MSB) | | | | | | | | 3 | 2206 |
| Vendor-Id = [0000 159FH] (3GPP2 Vendor-Id) | | | | | | | | 4 | |
| | | | | | | | | 5 | |
| | | | | | | | (LSB) | 6 | |
| Vendor-type = [3FH] | | | | | | | | 7 | 2207 |
| Vendor-length = [0CH] | | | | | | | | 8 | 2208 |
| Content ID | | | | | | | | 9 | 2209 |
| Decryption Key | | | | | | | | 10 | 2210 |
| (MSB) | | | | | | | | 11 | |
| Start Time | | | | | | | | 12 | 2211 |
| | | | | | | | | 13 | |
| | | | | | | | (LSB) | 14 | |
| (MSB) | | | | | | | | 15 | 2212 |
| End Time | | | | | | | | 16 | |
| | | | | | | | | 17 | |
| | | | | | | | (LSB) | 18 | |

FIG. 22

DECRYPTION-KEY DISTRIBUTION METHOD AND AUTHENTICATION APPARATUS

INCORPORATION BY REFERENCE

The present application is a continuation application of U.S. application Ser. No. 11/445,178, filed Jun. 2, 2006, now abandoned; which claims priority from Japanese Patent Application No. 2005-165685, filed Jun. 6, 2005, the entire disclosures of which are incorporated herein by reference.

BACKGROUND OF THE INVENTION

The present invention relates to decryption-key distribution methods and authentication apparatuses. The present invention mainly relates to radio communication methods which allow encrypted data to be distributed through a broadcasting channel, and more particularly, to a decryption-key distribution method and an authentication apparatus used in CDMA radio communication systems.

The Third Generation Partnership Project 2 (3GPP2), an international standardization organization, has been standardized the CDMA2000 1× method, which is a mobile communication method allowing audio communication and data communication, and the CDMA2000 1× evolution-data only (1×EV-DO) method, which is a mobile communication method that has improved frequency use efficiency by dedicating itself to data communication only. Unicast communication, communication between terminals on a one-to-one correspondence basis, has been implemented in a mobile network by the CDMA2000 1× and CDMA2000 1×EV-DO methods. Implementation of multicast communication, communication between one terminal and multiple terminals, has been examined.

As a technical element for implementing multicast communication, a broadcast channel for data transfer in a radio interface has been standardized. For example, a broadcast channel for the CDMA2000 1× method has been standardized in C.S0001-D v1.0, C.S0002-D v1.0, C.S0003-D v1.0, C.S0004-D v1.0, and C.S0005-D v1.0, which are all 3GPP2 standards published in March, 2004. In addition, a broadcast channel for the CDMA2000 1×EV-DO method has been standardized in C.S0054-0 v1.0, published by 3GPP2 in March, 2004. A service using a broadcast channel is called a broadcast multicast service (BCMCS).

A Unicast channel, conventionally used for communication between a base station and a mobile terminal, allows only the single mobile terminal to receive data sent from the base station. In contrast, a broadcast channel, standardized for supporting multicast communication, allows all mobile terminals which can receive radio to receive data sent from a base station. Therefore, data transmitted through a broadcast channel can be received by all mobile terminals. To allow only a group of selected mobile terminals to receive data, a method has been discussed in which data is encrypted, and a key (decryption key) necessary to decrypt the encrypted data is distributed to the group of selected mobile terminals in advance by unicast communication or other communication. As a method for distributing a decryption key to a mobile terminal, Chapter 7 and Chapter 10.2 of X.P0022-0 V.0.2, a proposed 3GPP2 standard, discloses a method in which a decryption key (broadcast access key: BAK) in the extensible markup language (XML) format is transmitted in response to an inquiry from a mobile terminal.

FIG. 24 is a structural view of a system for providing a BCMCS in a CDMA2000 1×EV-DO network. This figure shows a state in which data is sent to a plurality of mobile terminals through a broadcast channel of the CDMA2000 1×EV-DO method.

A contents server 108 generates and transmits broadcast-channel data. This data is transmitted as IP packets which are attached a multicast IP address to a broadcast serving node (BSN) 106. The contents server 108 encrypts the IP packets with the encryption key which is managed by a BCMCS controller 109 and transmits the packets. The contents server 108 receives in advance the encryption key necessary for encryption from the BCMCS controller 109 before transmitting the broadcast data.

The BSN 106 receives the packets, applies framing processing, such as HDLC-like framing defined in IETF RFC 1662, published in July, 1994, to the IP packets in order for mobile terminals to determine the boundaries of the IP packets, and transmits the IP packets to a packet control unit (packet control function: PCF) 104. The PCF 104 receives the packets from the BSN 106, buffers the packets, adjusts the transfer rate to a transfer rate suited to a radio bandwidth, and transmits the packets to a base station (access node: AN) 103.

The AN 103 receives the packets from the PCF 104, and transmits the packets by radio through a broadcast channel. The packets sent through the broadcast channel are received by a plurality of mobile terminals, such as access terminals (ATs) 101 and 102. The BCMCS controller 109 manages information on the broadcast data, a data base for holding an encryption key and a decryption key used for encrypting and decrypting the broadcast data, whether each mobile terminal has a receiving authority, and others.

In FIG. 24, an access network for authentication, authorization and accounting (AN-AAA) 105 is an authentication server for authenticating mobile terminals. The server determines, for example, whether the business party has approved a radio connection to a certain mobile terminal. A packet-data serving node (PDSN) 107 terminates point-to-point protocol (PPP) in order to support unicast communication with a mobile terminal. The PDSN 107 mediates packets between the IP protocol, used in the Internet 111, and a protocol used in the radio network. An authentication, authorization, and accounting unit (AAA) 110 is an authentication server for authenticating users who use the mobile terminals, and determines whether a connection to the Internet 111 through a radio connection from a user using a mobile terminal has been approved.

FIG. 2 shows a decryption-key distribution procedure based on Annex A of X.P0022, which is a proposed 3GPP2 standard.

The BSN 106 receives data to be transmitted through the broadcast channel, from the contents server 108, and sends the data to the AN 103 through the PCF 104. The AN 103 receives the data, and sends it to the AT 101 by radio through the broadcast channel (in step 201). The data received by the AT 101 has been encrypted. Since the AT 101 does not have a key (decryption key) for decryption, the AT 101 discards the data.

When the AT 101 is turned on, for example, a 1×EV-DO session is established between the AT 101 and the AN 103, and a parameter for a radio protocol to be used in subsequent processes and other items are determined in the establishment (in step 202). The AT 101 establishes a connection for data communication according to information of the established 1×EV-DO session (in step 203). This connection is for one-to-one-correspondence unicast communication between the AT 101 and the AN 103, and is separately prepared from the broadcast channel. Since communication is performed on this connection in steps 203 to 215, the contents of the communication cannot be received by the other ATs.

The AN 103 and PCF 104 determine that the AT 101 first established the connection after the session establishment (in step 202), and perform, before making the AT 101 ready for communication, terminal authentication that determines whether a communication right has been given to the AT 101. As a preparation for this terminal authentication, an authentication path is established between the AN 103 and the PCF 104 (in step 204).

To perform terminal authentication between the AT 101 and PCF 104, link control protocol (LCP), defined in PPP, is established (in step 205) by using the connection established in step 203 and the authentication path established in step 204. The PCF 104 sends, for example, a CHAP request message to the AT 101 to request terminal authentication (in step 206). The AT 101 calculates an authenticator by using information included in the CHAP request message and unique mobile-terminal information held by the AT 101, and sends a CHAP response message that includes the authenticator to the PCF 104 (in step 207). The PCF 104 sends an access request message that includes the received authenticator to the AN-AAA 105 (in step 208). The AN-AAA 105 checks the validity of the received authenticator.

When the AN-AAA 105 determines that the received authenticator is valid, the AN-AAA 105 sends an access accept message to the PCF 104 as a terminal-authentication approval (in step 209). The PCF 104 sends a CHAP success message to the AT 101 to report an authentication approval (in step 210).

Then, a data path is established between the AN 103 and PCF 104 in order to establish a unicast communication path (in step 211). A data path is also established between the PCF 104 and PDSN 107 (in step 212). PPP is established between the AT 101 and PDSN 107 (in step 213) in order to perform framing necessary for unicast communication.

To obtain a key for decrypting, for example, the encrypted broadcast data sent in step 201, the AT 101 transmits an HTTP information acquisition request message to the BCMCS controller 109 (in step 214). The BCMCS controller 109 sends an HTTP information acquisition response message that includes a decryption key and information on the valid period of the decryption key to the AT 101 (in step 215).

Then, the AT 101 can receive data (in step 216) because it can now decrypt the encrypted data sent from the AN 103 by using the decryption key received in step 215.

In conventional data transmission methods using a broadcast channel, when data is sent without encryption, the data can be received by mobile terminals other than the intended mobile terminal. For example, even a mobile terminal whose service contract with the communication business party has expired can receive data in some cases. To allow only the intended mobile terminal to receive data, a method has been examined in which data is encrypted and sent, and a key (decryption key) for decrypting the encrypted data is also sent.

In conventional decryption-key transmission methods, a unicast radio resource is obtained and a mobile terminal communicates by radio through the resource with a server managing decryption keys to obtain a decryption key. The procedure shown in FIG. 2 is disclosed in Annex A of X.P0022-0. In such a procedure, since a decryption key is sent through a unicast path, steps 211 to 215, for example, are required. Because the PDSN PPP session shown in step 213 needs to be terminated and the transaction processing performed by the BCMCS controller, shown in steps 214 and 215, is necessary, resources are used in the PDSN and BCMCS controller. In addition, since many steps are needed to obtain the decryption key, a long time is required therefor.

In this way, the decryption key cannot be obtained without obtaining a radio resource therefor. Data sent through a broadcast channel cannot be received without the decryption key. Therefore, even for receiving broadcast data which the base station providing communications does not need to obtain its communication condition, communication for sending the decryption key to the mobile terminal is required, resulting in increases in the amount of communication, in radio traffic, and in communication-network traffic.

If data to be sent through a broadcast channel is not encrypted in order to suppress the amount of communication used for obtaining the decryption key, mobile terminals other than the intended mobile terminal can receive the data, as described above, causing a problem.

In the conventional methods, in order to establish PPP between the PDSN 107 and AT 101 and to perform communication with the BCMCS controller 109, the PDSN 107 needs to manage and process an increased number of sessions and the BCMCS controller 109 needs to manage and process an increased number of transactions. With this reason, the PDSN 107 and the BCMCS controller 109 are requested to have high performance, sometimes resulting in a large-scale facility. Since PPP establishment and communication with the BCMCS controller 109 are necessary, a processing time is required until the AT 101 obtains the decryption key, and it takes long to start receiving broadcast data on the AT 101 side after a session is established.

SUMMARY OF THE INVENTION

In view of the foregoing points, an object of the present invention is to provide a decryption-key distribution method and an authentication apparatus which distribute a decryption key only to an intended mobile terminal safely without increasing the amount of communication caused by a special communication for obtaining the decryption key. Another object of the present invention is to update the decryption key during data receiving through a broadcast channel without any interruption. Still another object of the present invention is to receive the decryption key while suppressing an increase in a session count and an increase in a transaction count. Yet another object of the present invention is to shorten a processing time in which the mobile terminal obtains the decryption key. Another object of the present invention is to shorten a time from when the mobile terminal starts a session to when the mobile terminal starts receiving broadcast data. Another object of the present invention is to prevent communications from converging at the same period of time by changing timing to distribute the decryption key to each mobile terminal.

To solve the foregoing issues, the present invention is characterized by providing means for sending a decryption key in a procedure for authenticating a mobile terminal, so that the decryption key is transmitted only to a mobile terminal which is allowed to receive data sent through a broadcast channel. The present invention allows PPP establishment processing between the AT 101 and the PDSN 107 and a transaction generated between the AT 101 and the BCMCS controller 109 to be omitted, both of which are conventionally required. Therefore, the amount of processing required in the PDSN 107 and the BCMCS controller 109 can be reduced and a processing delay can be reduced because the number of transactions is reduced.

In addition, the present invention provides means for updating the decryption key periodically with a valid period being assigned to an already sent decryption key. The present invention is characterized by providing a procedure in which a mobile terminal which has received a decryption key cannot continuously receive data sent through a broadcast channel if the mobile terminal loses a right to receive the data. One example of this case is when the mobile-terminal contract is cancelled.

A decryption-key distribution method of the present invention is, for example, a decryption-key distribution method used in a radio communication system that employs a radio technique where data is encrypted and sent through a broadcast channel provided for data distribution between a radio base station and a radio terminal, characterized in that, when the radio terminal performs terminal authentication, a key for decrypting the encrypted data is sent by a signal used for the terminal authentication.

In the decryption-key distribution method, when a first decryption key for the data currently being transmitted, a second decryption key or a desired number of decryption keys for data to be transmitted in the future, and the start time of use of the second decryption key or the start time of use of each of the desired number of decryption keys are specified to update the decryption key, the decryption key can be switched.

In the decryption-key distribution method, when the radio base station sends a calling signal for performing terminal authentication, the terminal authentication can be started and the first decryption key, the second decryption key or the desired number of decryption keys, and the start time of use of the second decryption key or the start time of use of each of the desired number of decryption keys can be sent to the radio terminal.

In the decryption-key distribution method, when the radio base station sends a calling signal for performing terminal authentication to the radio terminal during communication through a connection for unicast communication between them, the terminal authentication can be started and the first decryption key, the second decryption key or the desired number of decryption keys, and the start time of use of the second decryption key or the start time of use of each of the desired number of decryption keys can be sent to the radio terminal.

In the decryption-key distribution method, when the radio base station sends a calling signal for performing terminal authentication to each radio terminal at different timing, communication traffic for distributing decryption keys diverges.

In one aspect, the present invention provides a decryption-key distribution method for distributing a decryption key to a radio terminal in a radio communication system where a contents server encrypts data with an encryption key received from a control unit managing the encryption key and/or the decryption key and sends the data to the radio terminal through a broadcast channel, and the radio terminal decrypts the received data with the decryption key corresponding to the encryption key and distributed in advance. The decryption-key distribution method includes: a step, performed by an authentication unit, of receiving a content type or content identification information, and a corresponding decryption key and valid period of the decryption key from the control unit and of storing the received content type or content identification information, corresponding decryption key, and valid period of the decryption key in a decryption-key data base in association with each other; a step, performed by the authentication unit, of receiving an authentication request that includes a terminal identifier from the radio terminal; a step, performed by the authentication unit, of authenticating the terminal in response to the received authentication request; a step, performed by the authentication unit, of referring to a content registration data base where the terminal identifier and the content type or content identification information of a content which the terminal can receive are stored in advance in association with each other, according to the terminal identifier included in the received authentication request to obtain the corresponding content type or content identification information; a step, performed by the authentication unit, of referring to the decryption-key data base according to the obtained content type or content identification information to obtain the corresponding decryption key and valid period of the decryption key; and a step, performed by the authentication unit, of sending an authentication result obtained in the step of authenticating the terminal, and the obtained decryption key and valid period of the decryption key to the radio terminal or a to packet control unit.

In another aspect, the present invention provides an authentication unit in a radio communication system where a contents server encrypts data with an encryption key received from a control unit managing the encryption key and/or a decryption key and sends the data to a radio terminal through a broadcast channel, and the radio terminal decrypts the received data with the decryption key corresponding to the encryption key and distributed in advance. The authentication unit includes: a decryption-key data base for storing a received content type or content identification information, decryption key, and valid period of the decryption key in association with each other; a content registration data base having stored in advance a terminal identifier and the content type or content identification information of a content which the terminal can receive, in association with each other; and a processing section for authenticating the terminal and distributing the decryption key, wherein the processing section receives a content type or content identification information, a corresponding decryption key and valid period of the decryption key from the control unit and stores them in the decryption-key data base, receives an authentication request that includes a terminal identifier from the radio terminal, authenticates the terminal in response to the received authentication request, refers to the content registration data base according to the terminal identifier included in the received authentication request to obtain a corresponding content type or content identification information, refers to the decryption-key data base according to the obtained content type or content identification information to obtain a corresponding decryption key and valid period of the decryption key, and sends an authentication result and the obtained decryption key and valid period of the decryption key to the radio terminal or to a packet control unit.

According to the present invention, a decryption-key distribution method for safely distributing a decryption key only to a mobile terminal which intends to receive the key is implemented without increasing the amount of communication dedicated to decryption-key distribution. In addition, according to the present invention, the decryption key can be updated without any interruption while data is being received through a broadcast channel. Further, according to the present invention, a decryption key can be received while an increase in the number of sessions and an increase in the number of transactions are suppressed. According to the present invention, a terminal can generate a decryption key in a reduced period of time. According to the present invention, a period from when a terminal starts a session to when the terminal starts receiving broadcast data can be reduced. According to the present invention, a decryption key is distributed to each

BRIEF DESCRIPTION OF THE DRAWINGS

FIG. 10 is a view showing the hardware of an AT.

FIG. 11 is a view showing a decryption-key data base of the AT.

FIG. 22 is a view showing the format of an access accept message.

DESCRIPTION OF THE PREFERRED EMBODIMENTS

Hardware Configuration and Data Format

Figure 1:
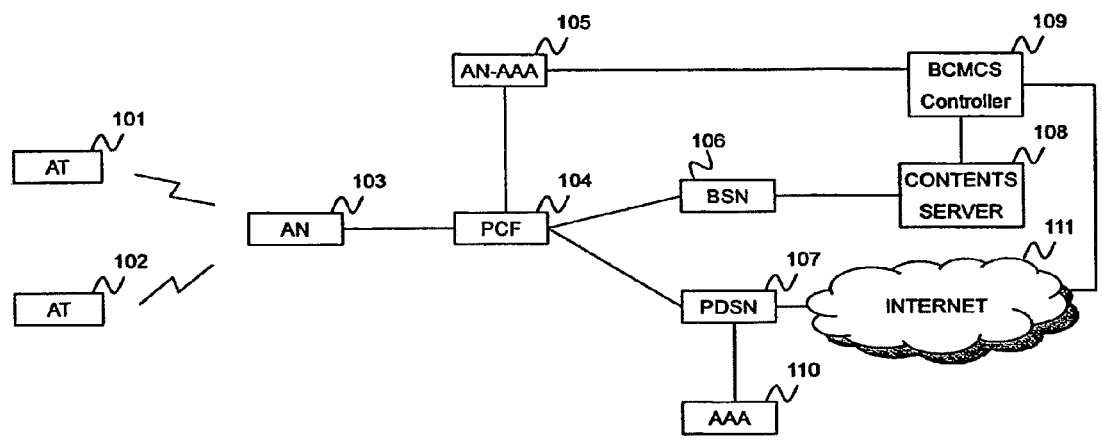
FIG. 1 is a view showing the structure of a 1×EV-DO network for distributing a decryption key.

FIG. 1 is a view showing the structure of a 1×EV-DO network system according to an embodiment of the present invention.

The 1×EV-DO network system shown in FIG. 1 is used as an example in the following description. The present invention can also be applied to systems having a mobile-terminal authentication function and a broadcast channel through which encrypted data can be transmitted.

The network system includes, for example, a base station (access node: AN) 103, a packet control unit (packet control function: PCF) 104, an authentication unit (access network for authentication, authorization and accounting: AN-AAA) 105, a BCMCS service unit (broadcast serving node: BSN) 106, a packet-data service unit (packet-data serving node: PDSN) 107, a contents server 108, a BCMCS controller 109, and an authentication, authorization, and accounting unit (AAA) 110. To distribute a decryption key used for decrypting broadcast data to an access terminal (AT), the BCMCS controller 109, which manages decryption keys, is also connected. Since each unit is the same as that described above, a description thereof is omitted here.

Figure 10:
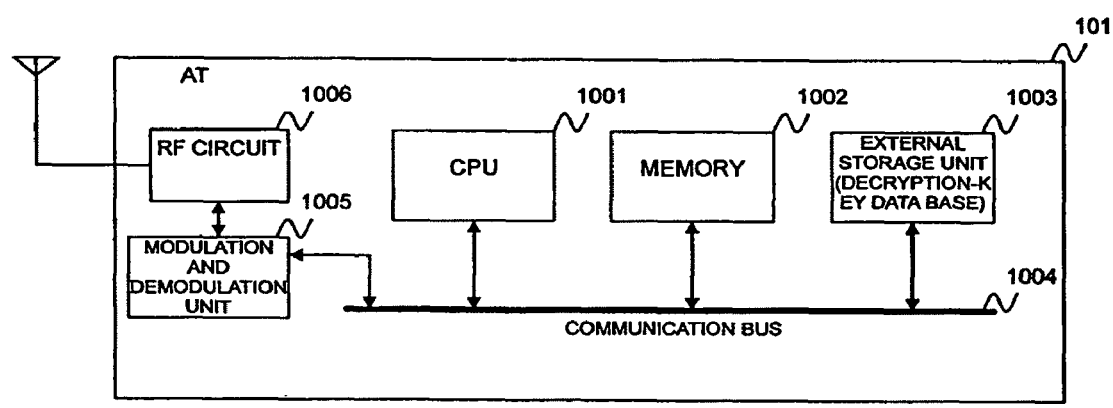

FIG. 10 shows the hardware configuration of the AT. The AT includes a CPU 1001 for processing a data transfer routine and a call control program for communicating with the AN 103, a memory 1002 for temporarily storing software being executed and data in data processing, an external storage unit 1003 having a decryption-key data base that manages decryption keys used for decrypting encrypted broadcast data, a modulation and demodulation unit 1005 for modulating data to be sent to the AN 103 to generate a radio signal and for demodulating a radio signal received from the AN 103 to obtain data, and a radio frequency (RF) circuit 1006 for transmitting and receiving radio signals. Each component is connected, for example, via a communication bus 1004 serving as a communication line implementing communication between components.

When the AT receives broadcast data from the AN 103, the RF circuit 1006 receives a radio signal and the modulation and demodulation unit 1005 demodulates the radio signal to obtain the broadcast data. The obtained broadcast data is temporarily written in the memory 1002. The CPU 1001 accesses the external storage unit 1003, having the decryption-key data base, to obtain a corresponding decryption key to decrypt the received data written in the memory 1002. For example, the CPU 1001 obtains a decryption key appropriate for the current time by referring to the valid periods stored in the decryption-key data base. When the received data written in the memory 1002 is decrypted, receiving the broadcast data is completed.

Figure 11:
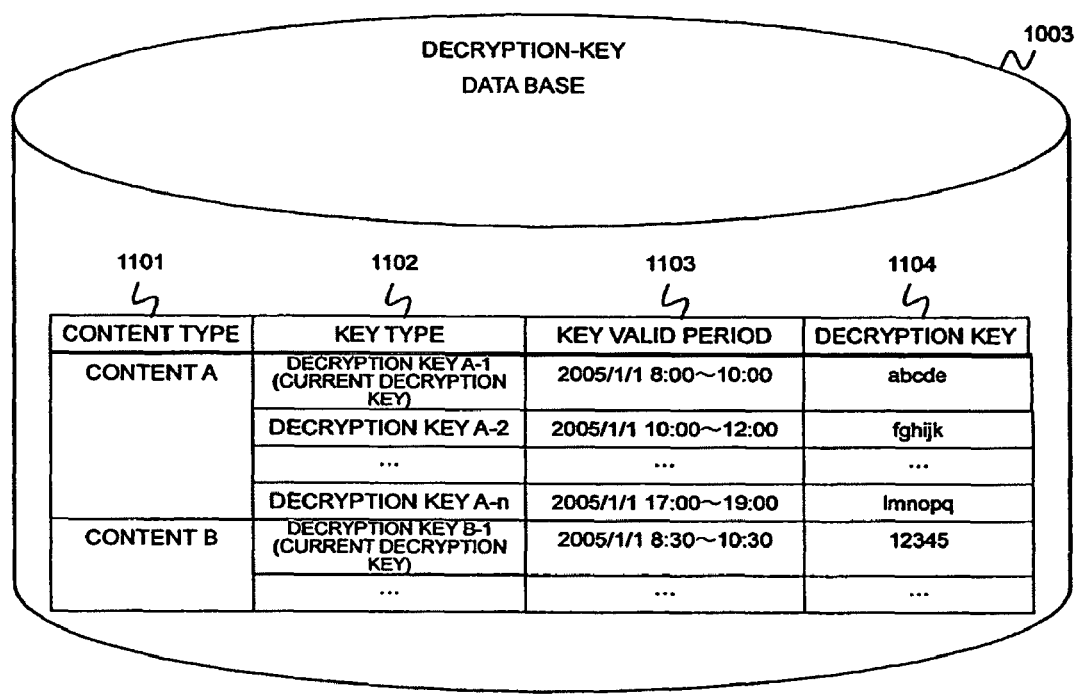

FIG. 11 shows an example detailed structure of the decryption-key data base held by the AT. The decryption-key data base 1003 includes a content type 1101, a key type 1102, a key valid period 1103, and a decryption key 1104 corresponding to the content type 1101 and the key valid period 1103. The data base can include a plurality of pieces of contents information. When the AT receives encrypted broadcast data, the AT uses the time when it received the data and the content type of the data to select the corresponding decryption key written in the decryption-key data base 1003, and decrypts the data with the decryption key. The key type may be omitted. The content type may be content identification information for identifying each content, or information indicating each content group.

Figure 12:
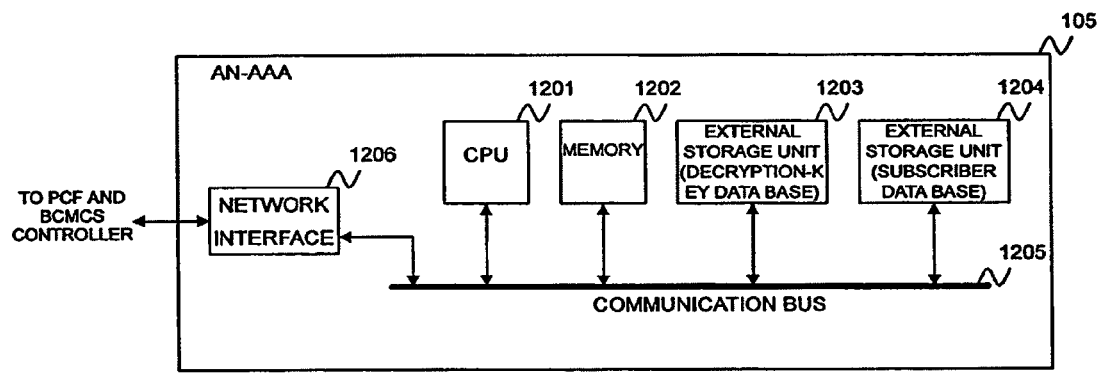
FIG. 12 is a view showing the hardware of the AN-AAA.

FIG. 12 is a view showing the hardware configuration of the AN-AAA 105. The AN-AAA 105 includes a CPU 1201 for processing a call-control protocol used for communications with the PCF 104 and the BCMCS controller 109, calculations required for terminal authentication, and decryption-key distribution, a memory 1202 for temporarily storing software being executed and data in data processing, a first external storage unit 1203 having a decryption-key data base that manages decryption keys used for decrypting encrypted broadcast data, a second external storage unit 1204 having a subscriber data base that manages passwords used for terminal authentication and that stores information indicating the decryption keys corresponding to contents, which can be sent to each mobile terminal, and a network interface 1206 for communicating with the PCF 104, the BCMCS controller 109, and other units. Each component is connected, for example, via a communication bus 1205 serving as a communication line implementing communication between components. The first and second external storage units may be one storage unit.

The AN-AAA 105 receives a terminal-authentication request from the PCF 104 via the network interface 1206, and temporarily stores the request in the memory 1202. The CPU 1201 reads the request from the memory 1202 and accesses the external storage unit 1204, having the subscriber data base, to obtain the password corresponding to the mobile terminal which generated the request. The CPU 1201 compares the password received in the request with the password stored in the external storage unit 1204 (or compares authenticators based on the passwords). When they match, the CPU 1201 determines that the terminal authentication has succeeded. Then, the CPU 1201 accesses the external storage unit 1203, having the decryption-key data base, to obtain the decryption key to be sent to the mobile terminal. The CPU 1201 sends via the network interface 1206 a result showing that the terminal authentication has succeeded and the decryption key to the PCF 104. If the terminal authentication does not succeed, the acquisition and transmission of the decryption key can be omitted.

Figure 13:
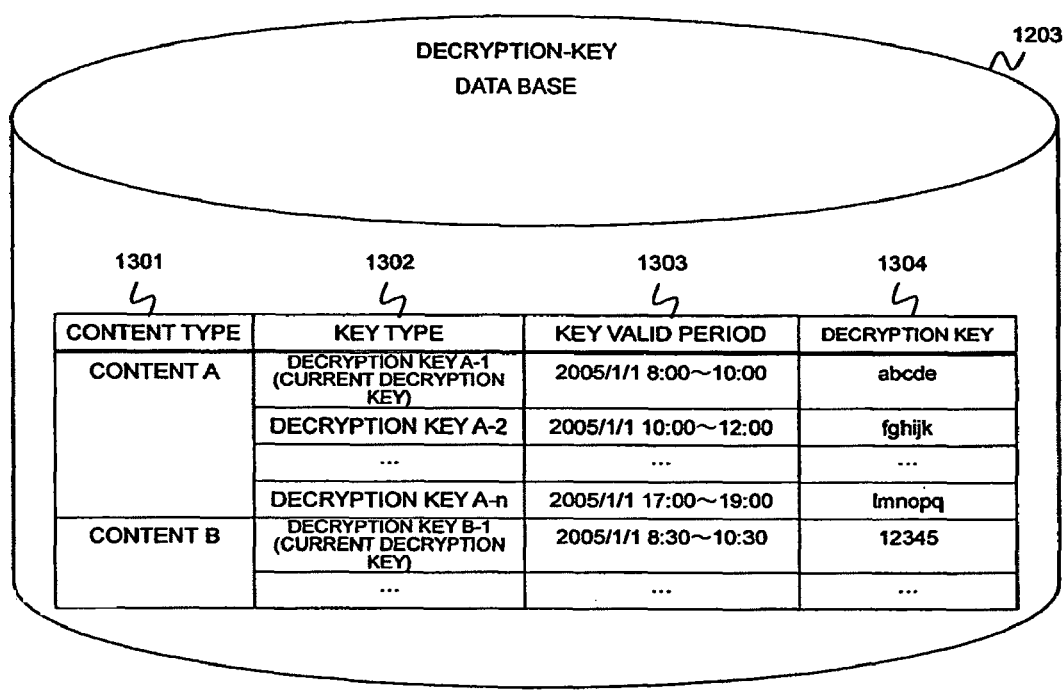
FIG. 13 is a view showing a decryption-key data base of the AN-AAA.

FIG. 13 shows an example detailed structure of the decryption-key data base 1203 held by the AN-AAA 105. The decryption-key data base 1203 includes a content type 1301, a key type 1302, a key valid period 1303, and a decryption key 1304 corresponding to the content type 1301 and the key valid period 1303. The data base can include a plurality of pieces of contents information. To transmit a corresponding decryption key to an AT for which terminal authentication has succeeded, the AN-AAA 105 obtains an appropriate decryption key by referring to the decryption-key data base 1203. The key type may be omitted. The AN-AAA 105 obtains and stores in advance decryption keys and other information from the BCMCS controller 109, which manages the encryption keys and decryption keys. A detailed procedure will be described later.

Figure 14:
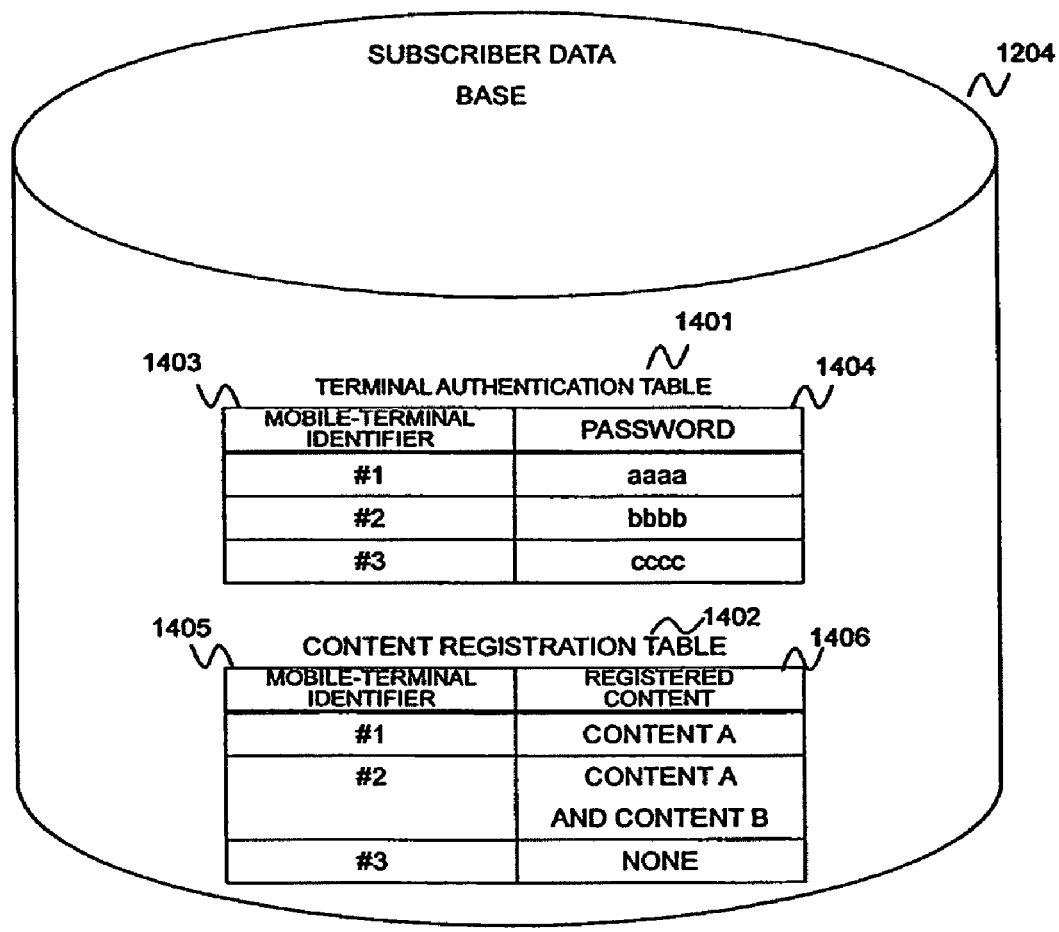
FIG. 14 is a view showing a subscriber data base of the AN-AAA.

FIG. 14 shows an example detailed structure of the subscriber data base 1204 held by the AN-AAA 105. The subscriber data base 1204 has a terminal authentication table 1401 used for terminal authentication and a content registration table 1402 indicating a registration state that shows a content or contents allowed to each terminal.

The terminal authentication table 1401 shows the correspondence between a mobile-terminal identifier 1403 and a password 1404. The content registration table 1402 shows the correspondence between a mobile-terminal identifier 1405 and a registered content 1406 which each mobile terminal is allowed to receive. The terminal authentication table 1401 and the content registration table 1402 can be stored in advance. These two tables 1401 and 1402 may be combined into one table. In addition to a table structure, any appropriate format can be used. This also applies to other tables.

Figure 15:
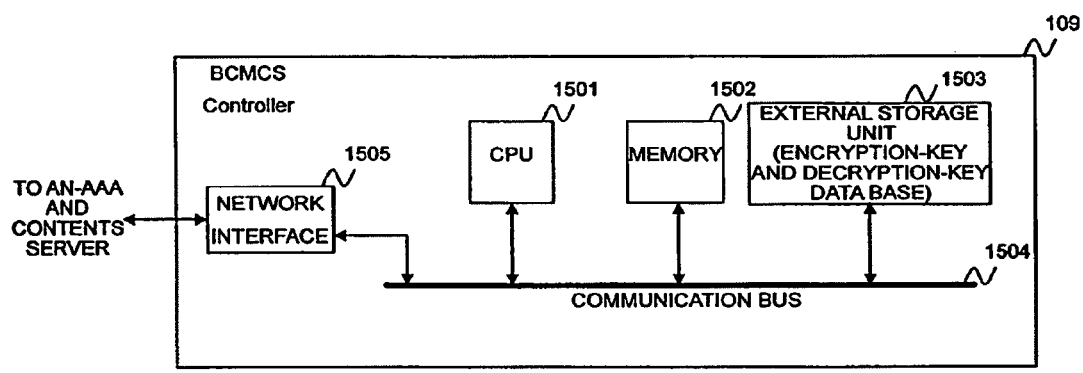
FIG. 15 is a view showing the hardware of a BCMCS controller.

FIG. 15 is a view showing the hardware configuration of the BCMCS controller 109. The BCMCS controller 109 includes a CPU 1501 for processing a call-control protocol used for communications with the AN-AAA 105 and the contents server 108, a memory 1502 for temporarily storing software being executed and data in data processing, an external storage unit 1503 having an encryption-key and decryption-key data base that manages a table in which encryption keys and decryption keys correspond to each broadcast-data content, and a network interface 1505 for communicating with the AN-AAA 105, the contents server 108, and other units. Each component is connected, for example, via a communication bus 1504 serving as a communication line implementing communication between components. When the BCMCS controller 109 sends an encryption key or a decryption key to the AN-AAA 105 or to the contents server 108, the CPU 1501 accesses the external storage unit 1503, having the encryption-key and decryption-key data base, to obtain the encryption key or the decryption key. These keys are sent to the AN-AAA 105 or to the contents server 108 via the network interface 1505.

Figure 16:
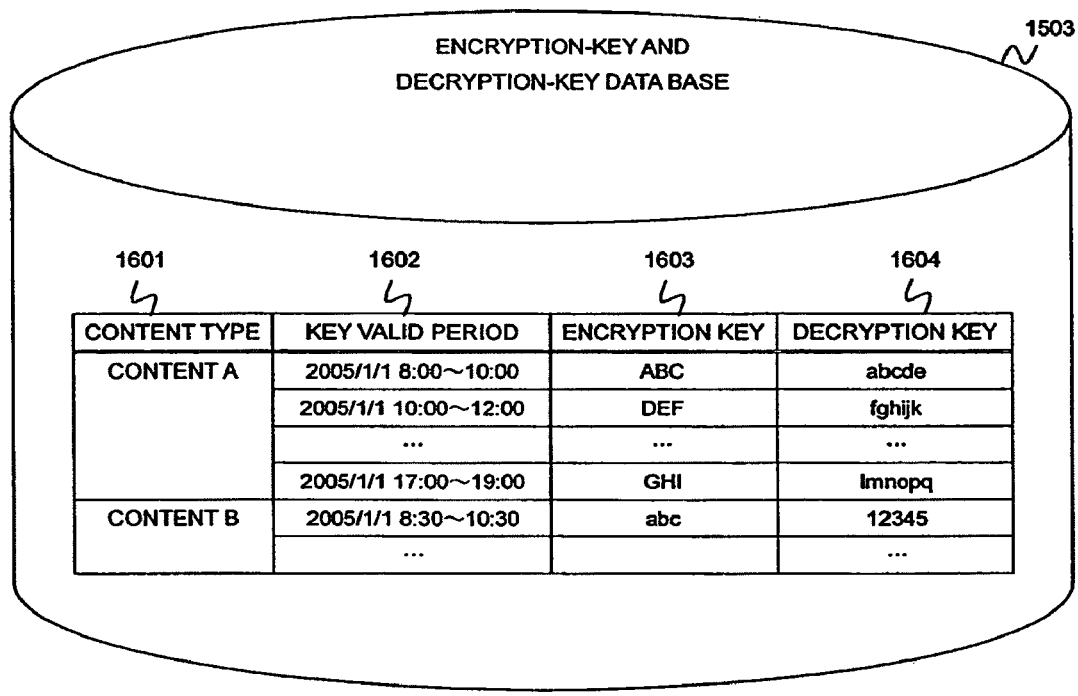
FIG. 16 is a view showing an encryption-key and decryption-key data base of the BCMCS controller.

FIG. 16 shows an example detailed structure of the encryption-key and decryption-key data base 1503 held by the BCMCS controller 109. The encryption-key and decryption-key data base 1503 includes a content type 1601, a key valid period 1602, and an encryption key 1603 and a decryption key 1604 corresponding to the content type 1601 and the key valid period 1602. The data base can include a plurality of pieces of contents information. The BCMCS controller 109 uses information stored in the data base to distribute a decryption key to the AN-AAA 105 and to distribute an encryption key to the contents server 108. Each information can be registered in advance manually or automatically.

Figure 17:
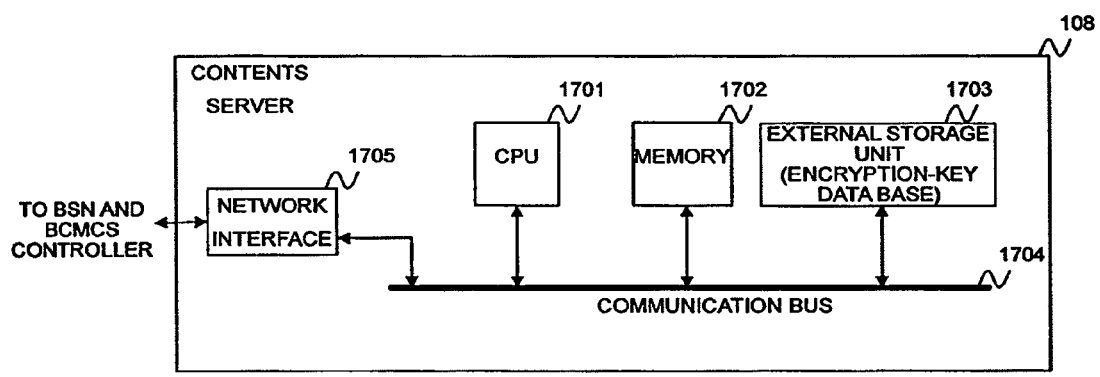
FIG. 17 is a view showing the hardware of a contents server.

FIG. 17 is a view showing the hardware configuration of the contents server 108. The contents server 108 includes a CPU 1701 for processing a call-control protocol used for communications with the BSN 106 and the BCMCS controller 109, a memory 1702 for temporarily storing software being executed and data in data processing, an external storage unit 1703 having an encryption-key data base that manages a table in which an encryption key is specified for each broadcast-data content, and a network interface 1705 for communicating with the BSN 106, the BCMCS controller 109, and other units. Each component is connected, for example, via a communication bus 1704 serving as a communication line implementing communication between components.

The contents server 108 receives information indicating an encryption key necessary for encrypting broadcast data and the valid period of the encryption key, from the BCMCS controller 109, and stores them in the external storage unit 1703, having the encryption-key data base. To send broadcast data, the contents server 108 uses the information of the encryption key corresponding to the content type and current time to encrypt the broadcast data and sends it to the BSN 106 via the network interface 1705.

Figure 18:
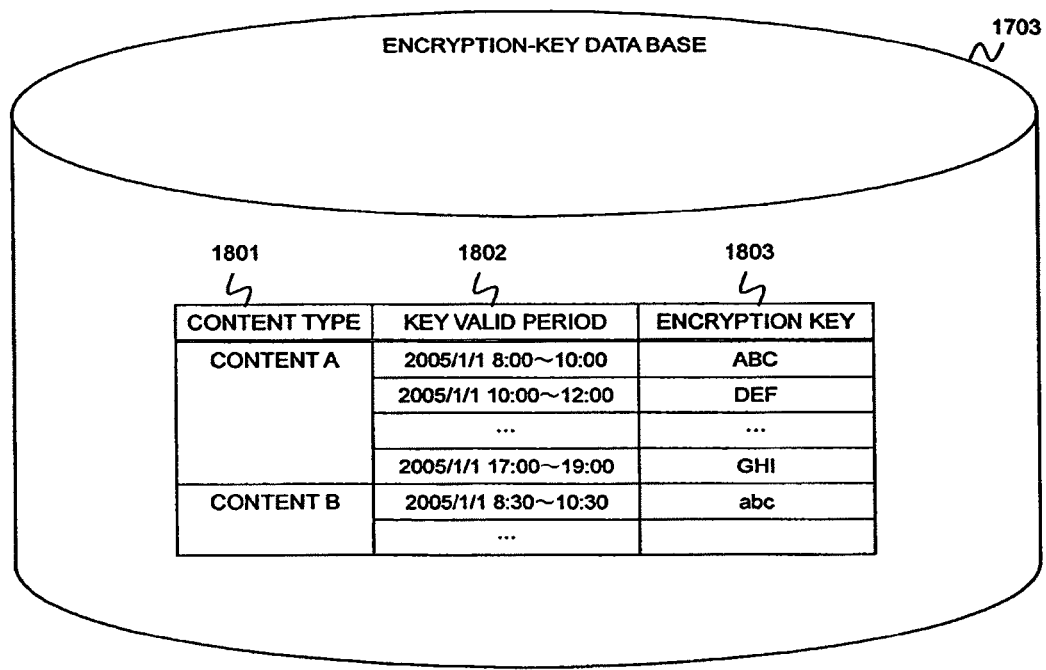
FIG. 18 is a view showing an encryption-key data base of the contents server.

FIG. 18 shows an example detailed structure of the encryption-key data base 1703 held by the contents server 108. The encryption-key data base 1703 includes a content type 1801, a key valid period 1802, and an encryption key 1803 corresponding to the content type 1801 and the key valid period 1802. The data base can include a plurality of pieces of contents information. To transmit broadcast data to the BSN 106, the contents server 108 uses an encryption key 1803 stored in the data base 1703 to encrypt the broadcast data.

Figure 19:
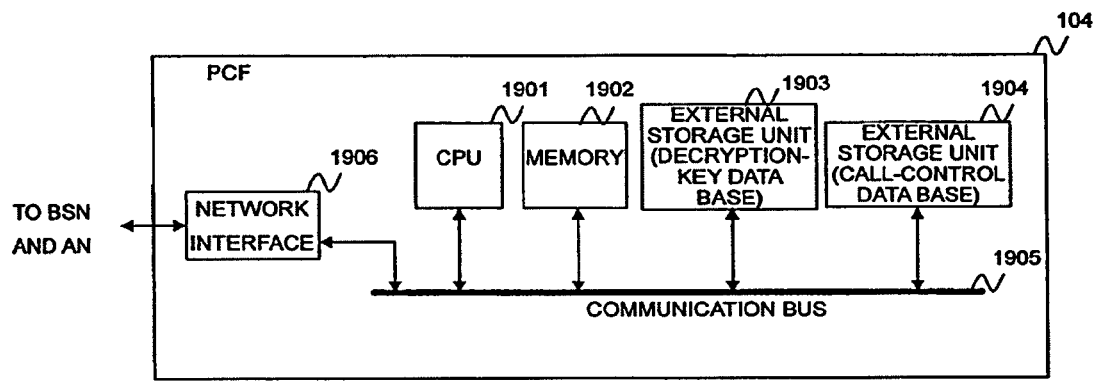
FIG. 19 is a view showing the hardware of a PCF.

FIG. 19 is a view showing the hardware configuration of the PCF 104. The PCF 104 includes a CPU 1901 for processing a call-control protocol used for communications with the BSN 106 and the AN 103, a memory 1902 for temporarily storing software being executed and data in data processing, a third external storage unit 1903 having a decryption-key data base that manages a table where a decryption key is specified for each broadcast-data content, a fourth external storage unit 1904 having a call-control data base that manages decryption keys already sent to ATs, and a network interface 1906 for communicating with the BSN 106, the AN 103, and other units. Each component is connected, for example, via a communication bus 1905 serving as a communication line implementing communication between components.

The PCF 104 stores a decryption key obtained from the AN-AAA 105 through terminal authentication, in the external storage unit 1903, having the decryption-key data base. To manage decryption keys already sent to ATs, the PCF 104 manages an already distributed decryption key and/or its valid period for each mobile terminal, in the external storage unit 1904, having the call-control data base. According to the contents recorded in the call-control data base 1904, re-distribution processing of a decryption key can be performed.

Figure 20:
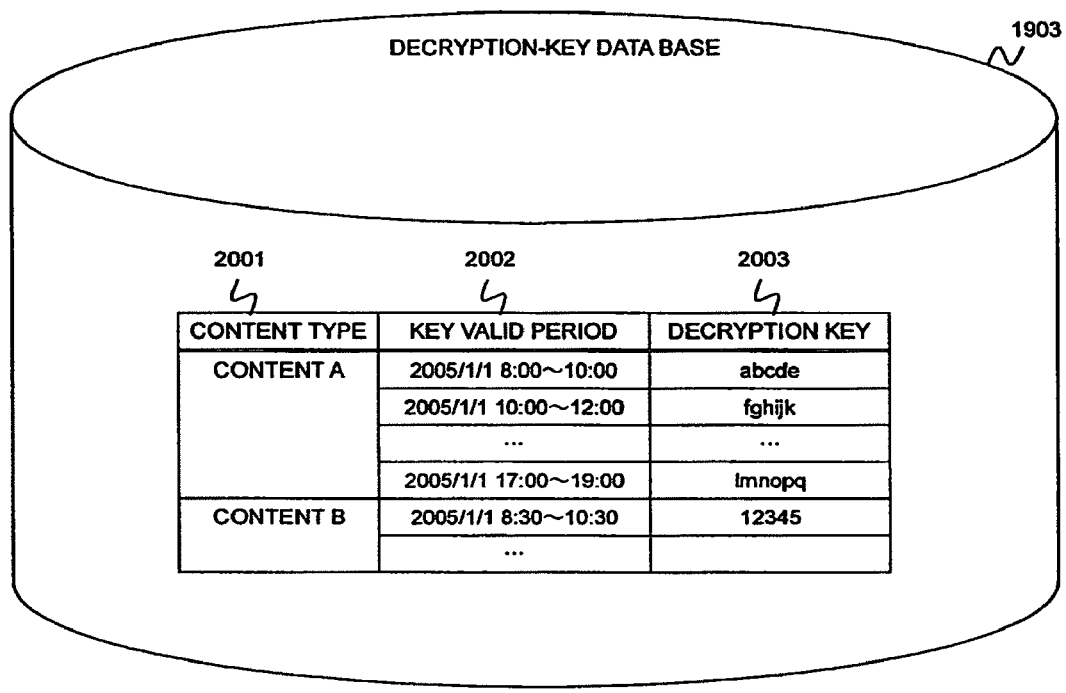
FIG. 20 is a view showing a decryption-key data base of the PCF.

FIG. 20 shows an example detailed structure of the decryption-key data base 1903 held by the PCF 104. The decryption-key data base 1903 includes a content type 2001, a key valid period 2002, and a decryption key 2003 corresponding to the content type 2001 and the key valid period 2002. The data base can include a plurality of pieces of contents information. The PCF 104 receives a decryption key from the AN-AAA 105 through terminal authentication, and records it in the data base. The decryption-key data base 1903 can be omitted.

Figure 21:
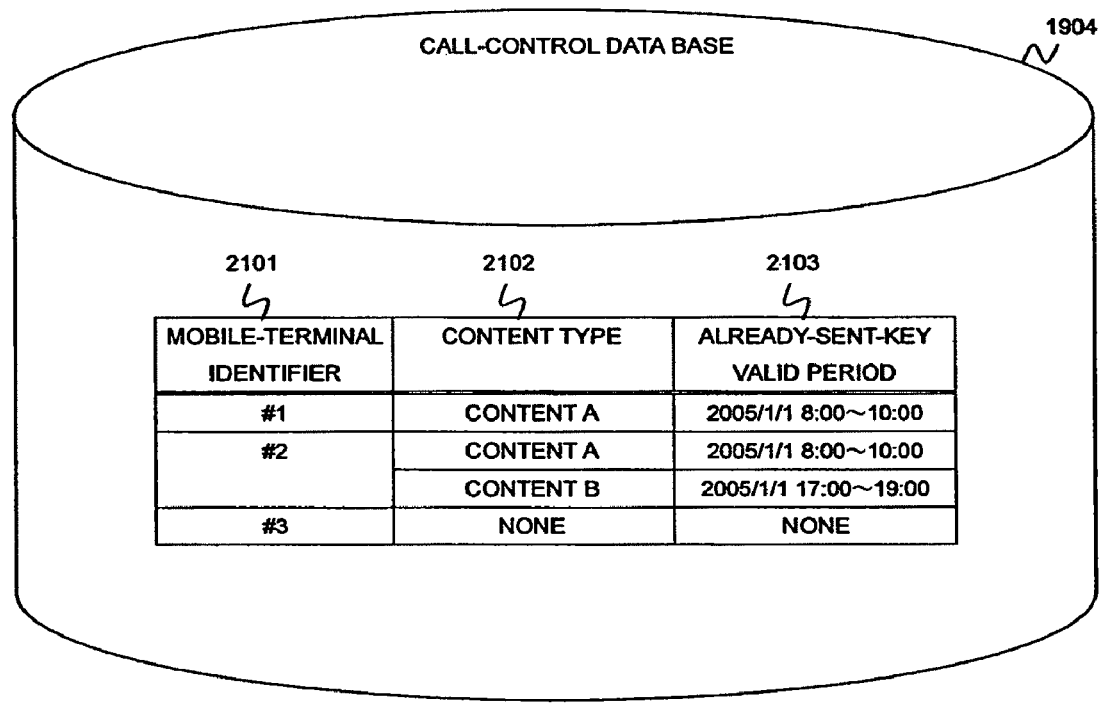
FIG. 21 is a view showing a call-control data base of the PCF.

FIG. 21 shows an example detailed structure of the call-control data base 1904 held by the PCF 104. The call-control data base 1904 includes a mobile-terminal identifier 2101 used to identify each mobile terminal, a content type 2102 corresponding to the decryption key already sent to the mobile terminal identified by the mobile-terminal identifier 2101, and an already-sent-key valid period 2103 indicating the valid period of the decryption key already sent to the mobile terminal.

The PCF 104 can confirm the valid period of a key according to the contents recorded in the call-control data base and determine a key re-distribution time. For example, the PCF 104 can send a new decryption key to an AT a predetermined time before the end of the valid period of the key already sent, by referring to the already-sent-key valid period 2103. The already-sent-key valid period may be the valid period of only the latest decryption key, or the end time of the valid period of the latest decryption key. A plurality of valid periods already sent may be included.

FIG. 22 shows an example format of an access accept message used for transferring a decryption key from the AN-AAA 105 to the PCF 104. A code field 2201 indicates the message type of the access accept message. An identifier field 2202 has a value changed for each message transmission and is used for message re-transmission control. A length field 2203 indicates the total length of the message in units of octets. A response authenticator field 2204 is used for authentication between the AN-AAA 105 and the PCF 104.

A decryption-key information element 2205 defines a field for sending a decryption key and its valid period. A vendor id field 2206 currently shows $159F_{16}$, defined in the 3GPP2, as an example. A vendor-type field 2207 shows $3F_{16}$, indicating that a decryption key is included in the information element. A vendor-length field 2208 indicates the length of fields included after the vendor-type field 2207, including the length of the vendor-type field 2207.

A content-ID field 2209 indicates the content type. A decryption-key field 2210 indicates the decryption key. A start-time field 2211 indicates the start time of the decryption-key valid period, and an end-time field 2212 indicates the end time of the decryption-key valid period. The AN-AAA 105 may include a decryption key, its valid period, and others in an appropriate message signal used for informing authentication approval/unapproval, other than an access accept message, and send the signal to the AT.

Decryption-key Distribution Procedure

Figure 3:
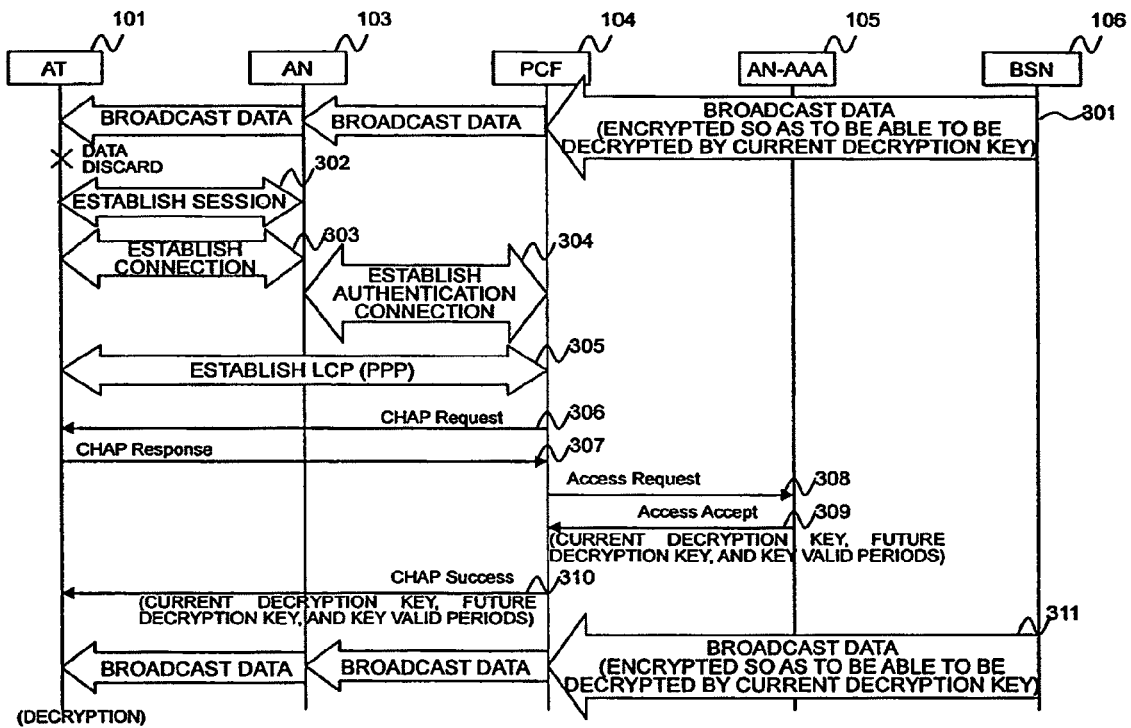
FIG. 3 is a view showing a decryption-key distribution procedure used in terminal authentication.

FIG. 3 shows a decryption-key distribution procedure used in terminal authentication.

The contents server 108 sends broadcast data to the AN 103 through the BSN 106 and PCF 104. The AN 103 receives the data, and sends it to the AT 101 by radio through a broadcast channel (in step 301). The data received by the AT 101 has been encrypted. Since the AT 101 does not have a key (decryption key) for decryption, the AT 101 discards the data. The contents server 108 uses an encryption key stored in its inside in the encryption-key data base 1703 to encrypt the broadcast data and sends it.

A 1×EV-DO session is established between the AT 101 and the AN 103 (in step 302). This is performed at appropriate timing determined in advance, for example, when the AT 101 is turned on. Then, a connection for unicast communication is established (in step 303). Since this connection establishment is the first one after the 1×EV-DO session was established, an authentication path is established between the AN 103 and the PCF 104 (in step 304) as a preparation for terminal authentication.

To perform terminal authentication between the AT 101 and PCF 104, LCP, defined in PPP, is established (in step 305). The PCF 104 sends a CHAP request message to the AT 101 to request terminal authentication (in step 306). The AT 101 calculates an authenticator by using information included in the CHAP request message and unique mobile-terminal information held by the AT 101, and sends a CHAP response message that includes the authenticator and mobile-terminal identifier to the PCF 104 (in step 307). Appropriate messages can be used instead of the CHAP request message and the CHAP response message.

The PCF 104 sends an access request message that includes the received authenticator and mobile-terminal identifier to the AN-AAA 105 (in step 308). When the AN-AAA 105 determines that the received authenticator is valid, the AN-AAA 105 sends an access accept message to the PCF 104 as a terminal-authentication approval (in step 309). In the present embodiment, a decryption key (indicated as the current decryption key in the figure) necessary for decrypting, for example, the broadcast data being transmitted in step 301 and a decryption key (indicated as the future decryption key in the figure) necessary for decrypting broadcast data to be transmitted in the future, and the valid periods of the keys are transmitted in the access accept message. The use of these pieces of information will be described later.

Figure 23:
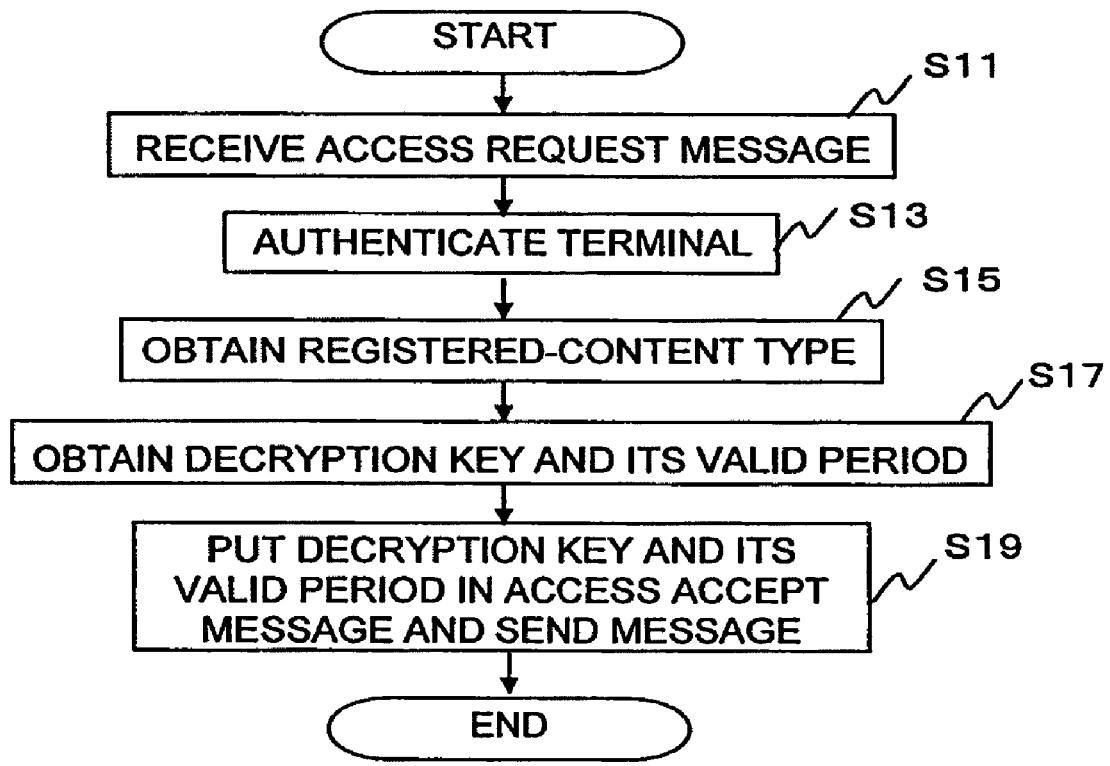
FIG. 23 is a flowchart of authentication and key distribution processing in the AN-AAA.
Figure 24:
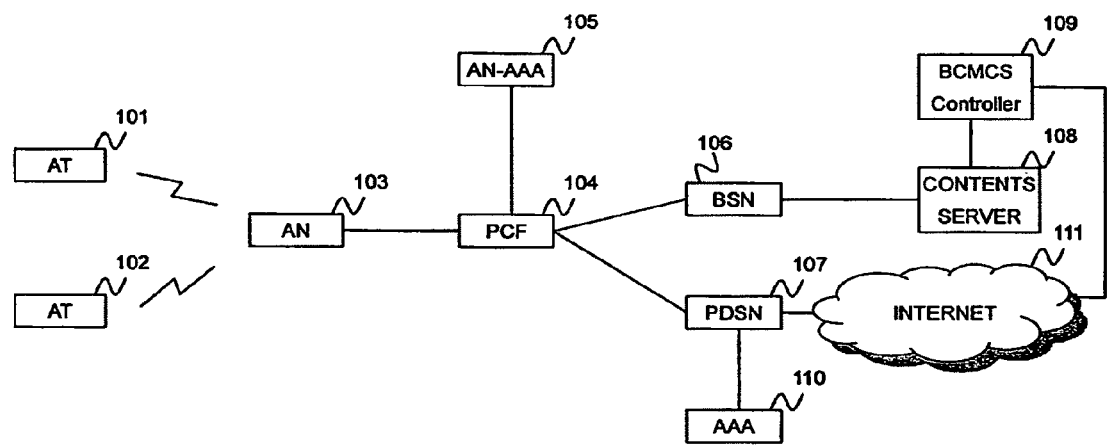
FIG. 24 is a view showing a conventional network.

FIG. 23 is a flowchart of authentication and key distribution performed by the AN-AAA 105. These processes can be executed, for example, by the CPU 1201 of the AN-AAA 105.

The AN-AAA 105 first receives the access request message (in step S11, which corresponds to step 308 in FIG. 3), and performs terminal authentication (in step S13). For example, the AN-AAA 105 refers to the terminal authentication table in the subscriber data base 1204 according to the mobile-terminal identifier included in the message to obtain the corresponding password. The AN-AAA 105 obtains an authenticator according to the mobile-terminal identifier and the password by the same method as used by the AT, and compares the obtained authenticator with the authenticator included in the access request message. When they match, the AN-AAA 105 determines that the terminal has been authenticated. If they do not match, the AN-AAA 105 can perform predetermined processing such as transmitting information indicating authentication unapproval to the PCF 104. An appropriate authentication method can be used such as verifying the mobile-terminal identifier and password, instead of verifying the authenticator.

When the terminal has been authenticated, the AN-AAA 105 refers to the content registration table in the subscriber data base 1204 according to the received mobile-terminal identifier to obtain the corresponding registered-content type (such as identifier) (in step S15). The AN-AAA 105 then refers to the decryption-key data base 1203 according to the obtained registered-content type to obtain the corresponding decryption key and its valid period (in step S17). A specified-in-advance number of decryption keys and valid periods can be obtained. The AN-AAA 105 puts the obtained decryption key and valid period in an access accept message, and sends it to the PCF 104 or to the AT (in step S19, which corresponds to step 309 in FIG. 3). For example, in the format of an access accept message shown in FIG. 22, the AN-AAA 105 can store the obtained content type in the content-ID field 2209, the obtained decryption key in the description-key field 2210, the start time of the obtained valid period in the start-time field 2211, and the end time thereof in the end-time field 2212, and send the message.

Back to FIG. 3, the PCF 104 records the information received from the AN-AAA 105 in the decryption-key data base and call-control data base held inside the PCF 104. For example, the PCF 104 stores the content type, key valid period, and decryption key included in the access accept message in association with each other in the decryption-key data base. The information stored in the data base is used when the decryption key is switched. The PCF 104 sends a CHAP success message to the AT 101 to tell that the terminal has been authenticated. The PCF 104 also sends the current decryption key, the future decryption key, and the key valid periods to the AT 101 (in step 310). These decryption keys and valid periods can be included in the CHAP success message and sent. The PCF 104 stores the content type and the valid periods of the decryption keys sent to the AT 101 in the call-control data base 1904 in association with the mobile-terminal identifier of the AT 101. The valid periods may be the latest (newest) valid period among the plurality of valid periods sent, a time difference between the earliest time to the latest time among the valid periods, or the end time of one of the valid periods.

The AT 101 stores the decryption keys and valid periods in the decryption-key data base 1003 in association with the content type received in step 310, and uses the current decryption key to decrypt encrypted broadcast data sent from the AN 103 (in step 311).

Figure 2:
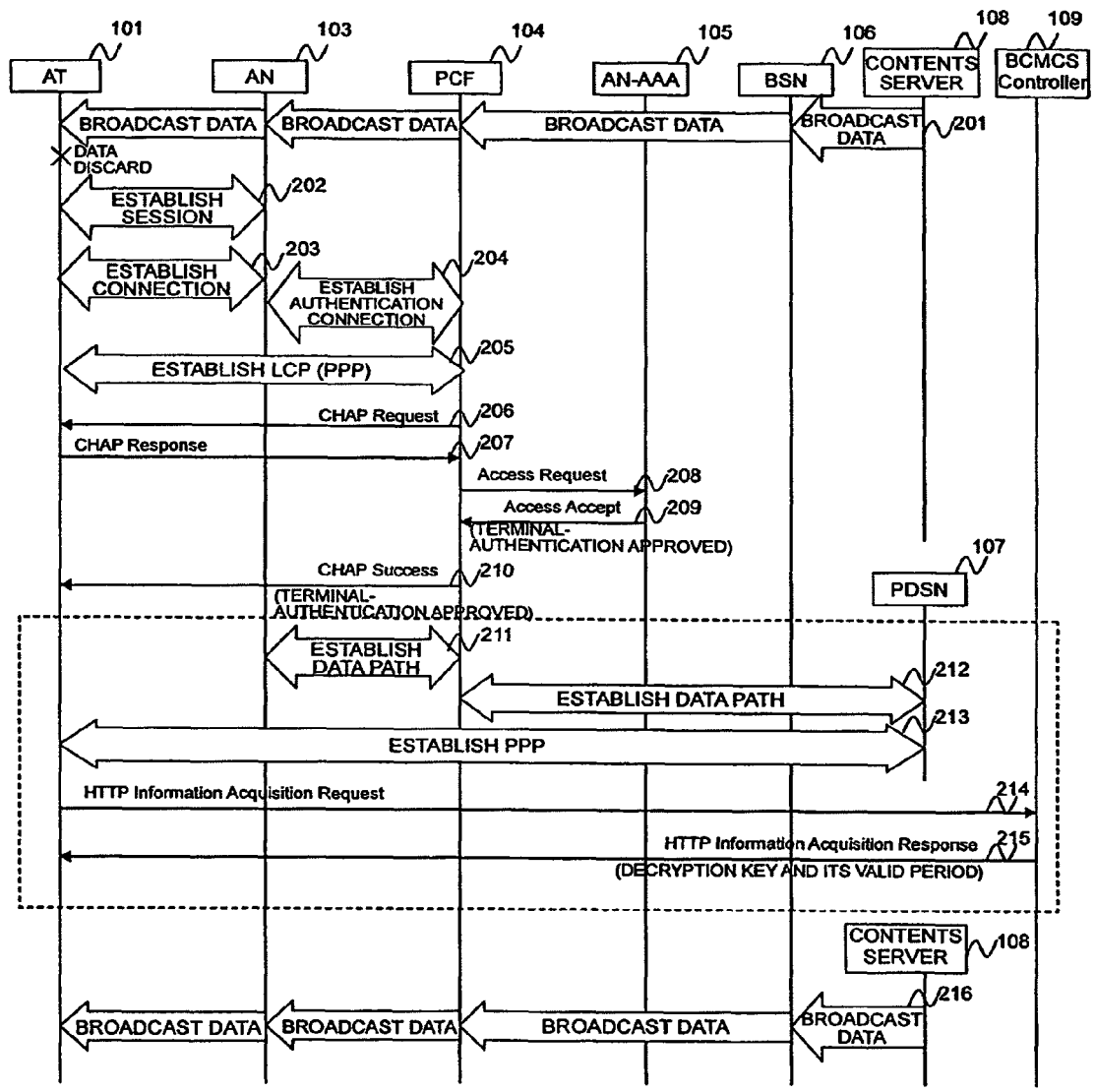
FIG. 2 is a view showing a decryption-key distribution procedure according to a known method.

As described above, since the decryption key used for decrypting broadcast data is sent during terminal authentication, the PPP establishment between the AT 101 and the PDSN 107 and the transaction between the AT 101 and the BCMCS controller 109, indicated in the conventional procedure shown in FIG. 2, can be omitted.

Key updating will be described next.

Figure 4:
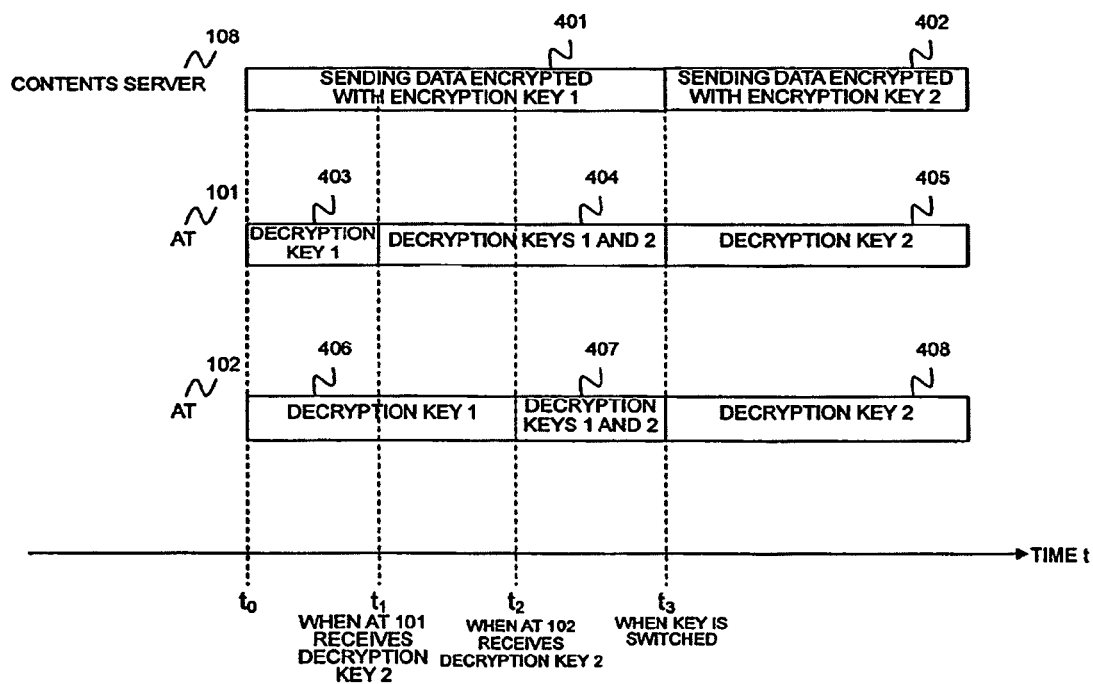
FIG. 4 is a view showing a decryption-key switching method.

FIG. 4 is a view showing a method for switching the decryption key. The contents server 108 sends encrypted data. For example, from time t0 to time t3 (when an encryption key 1 is valid), the contents server 108 sends data encrypted with the encryption key 1 (in state 401). In this period, since the data is encrypted with the encryption key 1, it is assumed that a decryption key 1 is necessary for decrypting the data. Since the contents server 108 sends data encrypted with another encryption key 2 at time t3 or later, a decryption key 2 is required to decrypt data sent in that period (in state 402).

The AT 101 holds the decryption key 1 at time t0 and therefore can decrypt at time t0 the data encrypted with the encryption key 1 and sent from the contents server 108 (in state 403). The AT 101 obtains the decryption key 2 at time t1, prior to time t3, in order to be capable of decrypting data encrypted with the encryption key 2 and sent at time t3 or later from the contents server 108. Consequently, the AT 101 can decrypt data sent from the contents server 108 with the use of the decryption key 1 from time t1 to t3 (when the decryption key 1 is valid), and holds the decryption key 2, to be used in the future to decrypt data at time t3 or later (in state 404). The AT 101 discards the decryption key 1 at time t3 and decrypts, with the decryption key 2, data encrypted with the encryption key 2 and sent from the contents server 108 (in state 405).

An AT 102 holds the decryption key 1 at time t0 and therefore can decrypt at time t0 data encrypted with the encryption key 1 and sent from the contents server 108 (in state 406). The AT 102 obtains the decryption key 2 at time t2, prior to time t3, in order to be capable of decrypting data encrypted with the encryption key 2 and sent at time t3 or later from the contents server 108. Consequently, the AT 102 can decrypt data sent from the contents server 108 with the use of the decryption key 1 from time t2 to t3, and holds the decryption key 2, to be used in the future to decrypt data at time t3 or later (in state 407). The AT 102 discards the decryption key 1 at time t3 and decrypts, with the decryption key 2, data encrypted with the encryption key 2 and sent from the contents server 108 (in state 408).

As described above, before the contents server 108 switches the encryption key, the decryption key to be used after switching is sent to each AT. Therefore, each AT can receive data continuously. In addition, decryption-key updating timing is changed for each AT, so that load does not converge at a certain period in the network and radio communication.

First Decryption-key Updating Procedure

Figure 5:
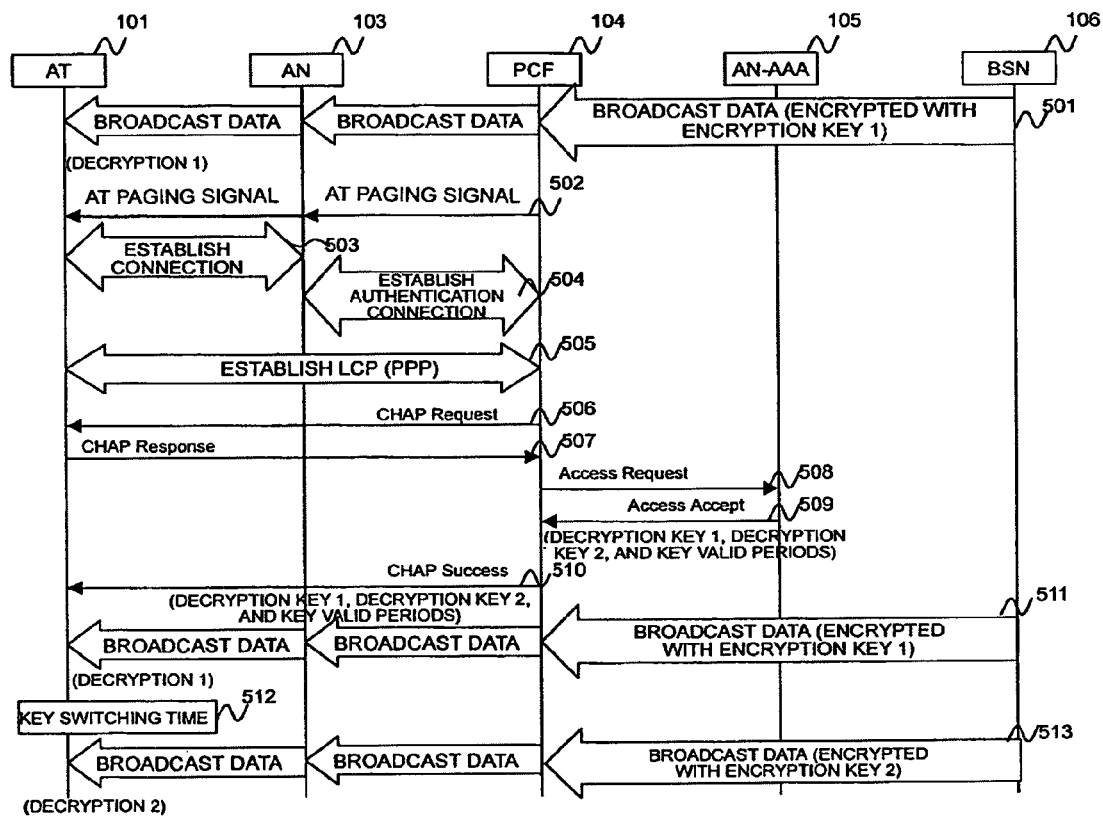
FIG. 5 is a view showing a decryption-key distribution procedure used in a re-authentication process.

FIG. 5 is a view showing a procedure for sending a decryption key to an AT at re-authentication. The procedure can be taken after the processing shown in FIG. 3 has been executed.

The BSN 106 sends broadcast data to the AN 103 through the PCF 104. The AN 103 receives the broadcast data, and sends it to the AT 101 by radio through a broadcast channel (in step 501). The data received by the AT 101 has been encrypted. Since the AT 101 already has the decryption key 1, which is the key (decryption key) for decrypting the data, by the above-described processing, the AT 101 decrypts the data (in decryption 1) to receive the original data.

The PCF 104 sends an AT paging signal for distributing the decryption key 2, to be used in the future, to the AT 101, through the AN 103 to the AT 101 (in step 502). Since the PCF 104 has recorded the valid period of the decryption key, already distributed to the AT 101, in the call-control data base in step 309, the PCF 104 can send the AT paging signal a predetermined period before the end time of the valid period. Information indicating that this paging signal is for performing terminal authentication is attached to the paging signal. The paging signal is sent a predetermined time before the end of the valid period of the decryption key. To avoid the convergence of communications with all ATs that are receiving broadcast data, at a certain period, a paging signal may be sent to each AT at different timing. For example, a paging signal may be sent to each AT at an interval of a predetermined time. Alternatively, after the decryption key is sent to the AT to which a paging signal has been sent, another paging signal may be sent to another AT.

In response to the paging signal, the AT 101 establishes a connection for unicast communication between the AT 101 and the AN 103 (in step 503). When the connection has been established, an authentication path is established between the AN 103 and the PCF 104 (in step 504) as a preparation for terminal authentication.

To perform terminal authentication between the AT 101 and the PCF 104, LCP, defined in PPP, is established (in step 505). The PCF 104 sends a CHAP request message to request terminal authentication (in step 506). The AT 101 calculates an authenticator by using information received with the CHAP request message and mobile-terminal unique information held by the AT 101, and sends a CHAP response message that includes the authenticator to the PCF 104 (in step 507). The PCF 104 sends an access request message that includes the received authenticator to the AN-AAA 105 (in step 508). The AN-AAA 105 determines the validity of the received authenticator. When the AN-AAA 105 determines that the authenticator is valid, it sends an access accept message indicating a terminal-authentication approval to the PCF 104 (in step 509). The AN-AAA 105 sends, with this access accept message, the decryption key (decryption key 1 in the figure) necessary for decrypting the broadcast data being transmitted in step 501, the decryption key (decryption key 2 in the figure) necessary for decrypting broadcast data to be transmitted in the future, and the valid period of each key. These pieces of information are stored in the decryption-key data base and the call-control data base of the PCF 104. The detailed processing performed in the AN-AAA 105 is the same as described above. The PCF 104 sends a CHAP success message to the AT 101 to inform the authentication approval, and also sends the decryption key 1, the decryption key 2, and their valid periods (in step 510).

The AT 101 can decrypt (in decryption 1) the broadcast data encrypted and being transmitted from the AN 103 by using the decryption key 1 received in step 510 or the decryption key 1 which the AT 101 already has to receive the original data (in step 511).

The AT 101 switches the decryption key to the decryption key 2 at the end time of the valid period of the decryption key 1 (or at the start time of the valid period of the decryption key 2), received in step 510, and uses the decryption key 2 to decrypt (in decryption 2) broadcast data (in step 512). Therefore, the AT 101 can continue to receive even broadcast data encrypted with the encryption key 2, without any interruption after the key has been switched (in step 513).

Second Decryption-key Updating Procedure

Figure 6:
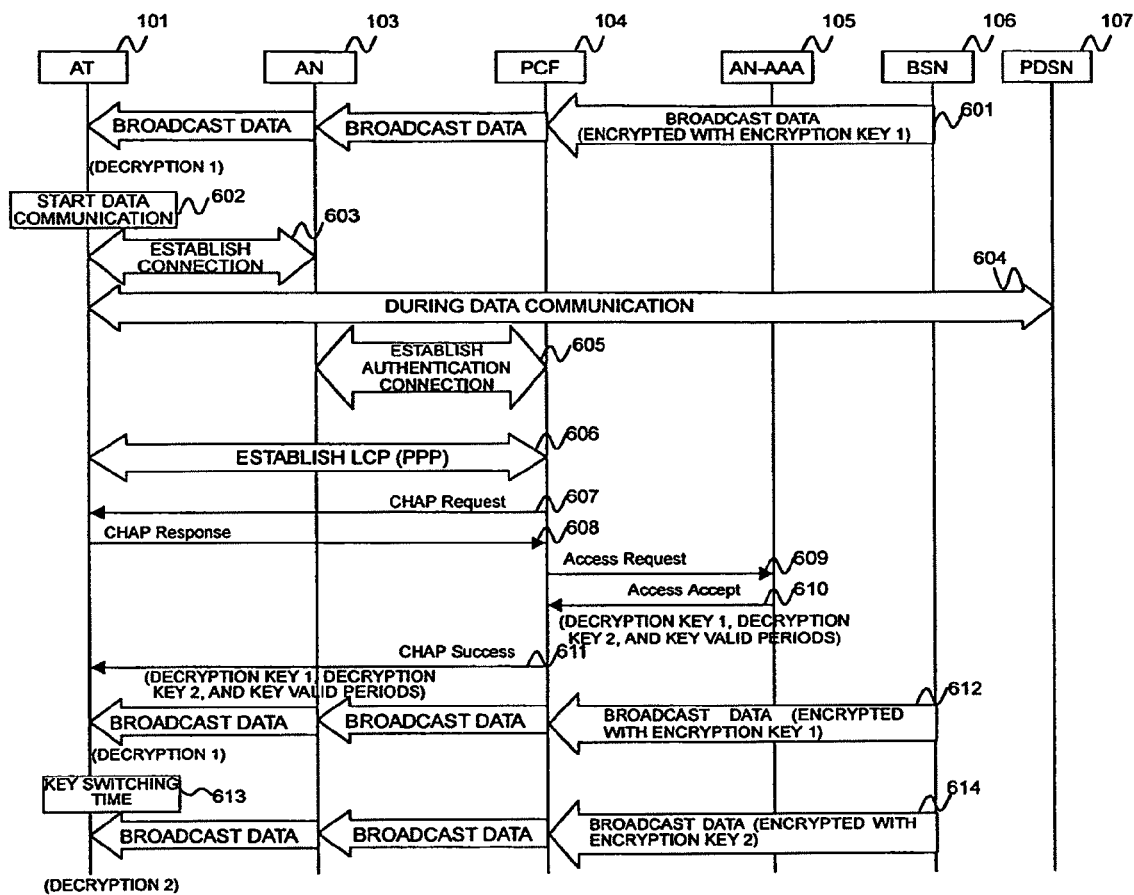
FIG. 6 is a view showing a decryption-key distribution procedure used during data communication.

FIG. 6 is a view showing a procedure for updating the decryption key during a period while the AT 101 is performing unicast data communication for another purpose. Since the unicast communication is already being performed, the radio resources can be used more effectively than in the procedure shown in FIG. 5, where AT paging is performed. For example, an AT paging signal is not required, and a session does not need to be established for decryption-key distribution because a connection between the AT and the AN 103 has already been established for data communication.

A method can be used, for example, in which the decryption key is updated with priority for an AT that is already performing communication and the procedure shown in FIG. 5, described above, is taken for an AT that has not performed unicast communication until the end (or a predetermined time before the end) of the valid period of the decryption key. A procedure for updating the decryption key for an AT that is performing communication will be described below.

The BSN 106 sends broadcast data to the AN 103 through the PCF 104. The AN 103 receives the broadcast data, and sends it to the AT 101 by radio through a broadcast channel (in step 601). The data received by the AT 101 has been encrypted. Since the AT 101 already has the decryption key 1, which is the key (decryption key) for decrypting the data, the AT 101 decrypts the data to receive the original data.

To start unicast data communication (in step 602) for web access, for example, the AT 101 establishes a connection with the AN 103 (in step 603). It is assumed that the data communication starts at timing determined by a user who uses the AT 101, such as when the user accesses a web site with a web browser by using the AT 101 in data communication. The AT 101 and the PDSN 107 perform unicast data communication via the AN 103 and the PCF 104 (in step 604). The PCF 104 may manage the identifier of the AT 101, which is performing data communication.

The PCF 104 establishes an authentication connection for distributing the decryption key 2, used in the future, to the AT 101, with the AN 103 (in step 605). This authentication connection is established a predetermined time before the end of the valid period of the decryption key 1. To avoid the convergence of communications with all ATs that are receiving broadcast data, at a certain period, an authentication connection may be established with each AT at different timing. To perform terminal authentication between the AT 101 and the PCF 104, LCP, defined in PPP, is established (in step 606). The PCF 104 sends a CHAP request message to request terminal authentication (in step 607). The AT 101 calculates an authenticator by using information received with the CHAP request message and unique mobile-terminal information held by the AT 101, and sends a CHAP response message that includes the authenticator to the PCF 104 (in step 608). The PCF 104 sends an access request message that includes the received authenticator to the AN-AAA 105 (in step 609). The AN-AAA 105 determines the validity of the received authenticator. When the AN-AAA 105 determines that the authenticator is valid, it sends an access accept message indicating a terminal-authentication approval to the PCF 104 (in step 610). The AN-AAA 105 sends, with this access accept message, the decryption key (decryption key 1 in the figure) necessary for decrypting the broadcast data being transmitted in step 601, the decryption key (decryption key 2 in the figure) necessary for decrypting broadcast data to be transmitted in the future, and the valid period of each key. The detailed processing performed is the same as described above. The PCF 104 sends a CHAP success message to the AT 101 to inform the authentication approval, and also sends the current decryption key, the future decryption key, and their valid periods to the AT 101 (in step 611).

The AT 101 can decrypt (in decryption 1) the broadcast data encrypted and being transmitted from the AN 103 by using the decryption key 1 received in step 611 or the decryption key 1 which the AT 101 already has to receive the original data (in step 612).

The AT 101 switches the decryption key to the decryption key 2 when the switching time of the key received in step 611 comes. Therefore, the AT 101 can decrypt even broadcast data encrypted with the encryption key 2 (in decryption 2) (in step 614) after the key has been switched. The AT 101 can continue to receive data without any interruption.

Modification of First Decryption-key Updating Procedure

Figure 7:
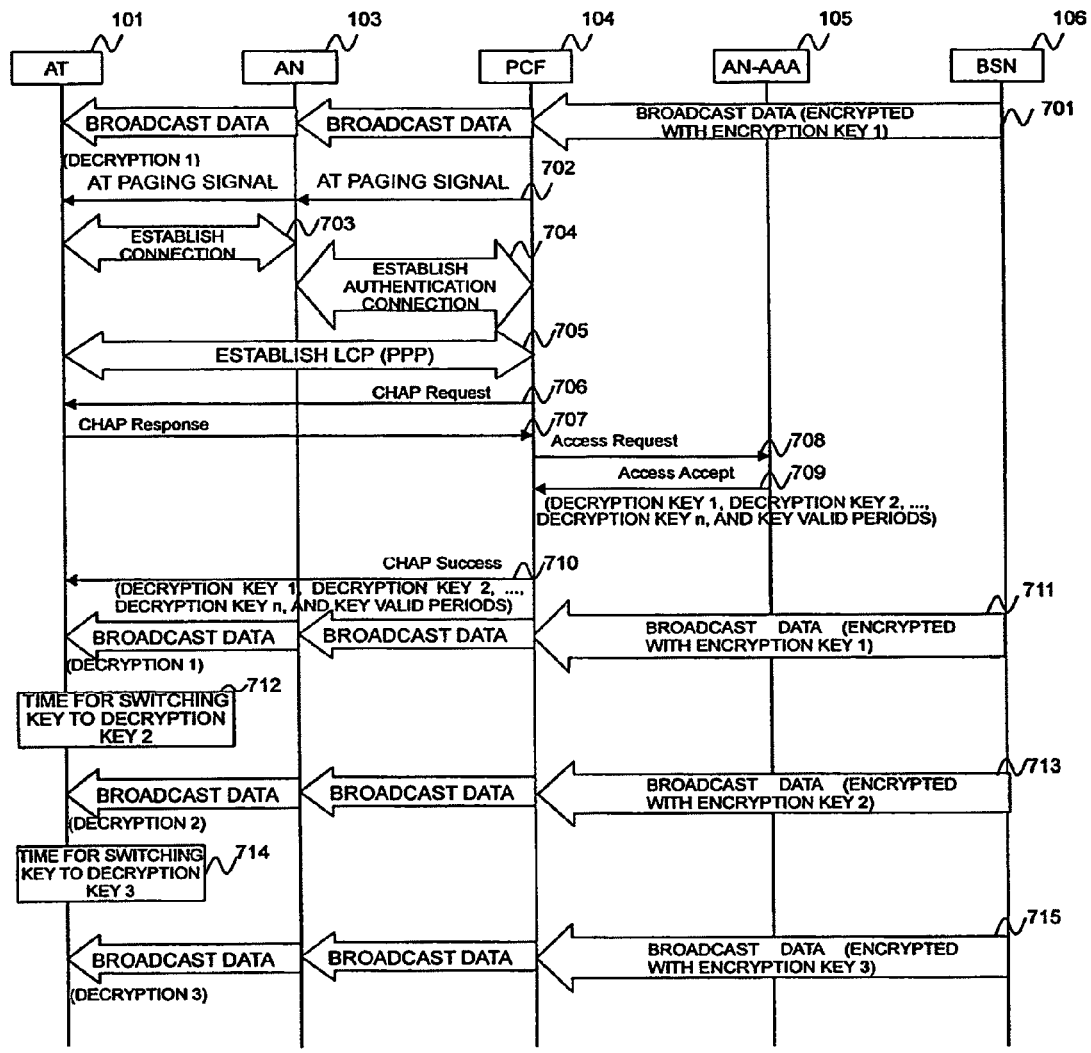
FIG. 7 is a view showing a procedure for sending three or more decryption keys.

FIG. 7 shows a procedure for sending three or more (hereinafter indicated by "n") decryption keys. The BSN 106 sends broadcast data to the AN 103 through the PCF 104. The AN 103 receives the broadcast data, and sends it to the AT 101 by radio through a broadcast channel (in step 701). The data received by the AT 101 has been encrypted. Since the AT 101 has the decryption key 1, which is the key (decryption key) for decrypting the data, the AT 101 decrypts the data to receive the original data.

The PCF 104 sends an AT paging signal for distributing n decryption keys, to be used in the future, to the AT 101, through the AN 103 to the AT 101 (in step 702). Information indicating that this paging signal is for performing terminal authentication is attached to the paging signal.

In response to the paging signal, the AT 101 establishes a connection for unicast communication between the AT 101 and the AN 103 (in step 703). When the connection has been established, an authentication path is established between the AN 103 and the PCF 104 (in step 704) as a preparation for terminal authentication.

To perform terminal authentication between the AT 101 and the PCF 104, LCP, defined in PPP, is established (in step 705). The PCF 104 sends a CHAP request message to request terminal authentication (in step 706). The AT 101 calculates an authenticator by using information received with the CHAP request message and unique mobile-terminal information held by the AT 101, and sends a CHAP response message that includes the authenticator to the PCF 104 (in step 707). The PCF 104 sends an access request message that includes the received authenticator to the AN-AAA 105 (in step 708). The AN-AAA 105 determines the validity of the received authenticator. When the AN-AAA 105 determines that the authenticator is valid, it sends an access accept message indicating a terminal-authentication approval to the PCF 104 (in step 709). The AN-AAA 105 sends, with this access accept message, the decryption key (decryption key 1 in the figure) necessary for decrypting the broadcast data being transmitted in step 701, the n decryption keys (decryption key 2, . . . , and decryption key n in the figure) necessary for decrypting broadcast data to be transmitted in the future, and the valid period of each decryption key. For example, the AN-AAA 105 obtains a predetermined number of decryption keys and valid periods from the decryption-key data base 1203 and sends them. The PCF 104 sends a CHAP success message to the AT 101 to inform the authentication approval, and also sends the current decryption key, the future decryption keys, and their valid periods (in step 710).

The AT 101 can decrypt the broadcast data encrypted and being transmitted from the AN 103 by using the decryption key 1 received in step 710 or the decryption key 1 which the AT 101 already has to receive the original data (in step 711).

The AT 101 switches the decryption key to the decryption key 2 (in step 712) at the end time of the valid period of the decryption key 1, received in step 710, or at the start time of the valid period of the decryption key 2, received in step 710.

Therefore, the AT 101 can continue to receive even broadcast data encrypted with the encryption key 2, without any interruption after the key has been switched (in step 713).

In the same way, the AT 101 switches the decryption key to the decryption key 3 (in step 714) at the key switching timing to the decryption key 3, received in step 710. Since a plurality of decryption keys has been sent to the AT 101 in step 710, the AT 101 does not need to perform terminal authentication again to obtain a decryption key. When the AT 101 could not successfully receive the paging signal in step 702, the decryption keys could not be sent successfully. In this case, since a plurality of decryption keys has been sent, the AT 101 can receive broadcast data continuously (in step 715). Even in the above-described decryption-key updating during data communication, a modification is possible in which three or more decryption keys are transmitted.

Figure 8:
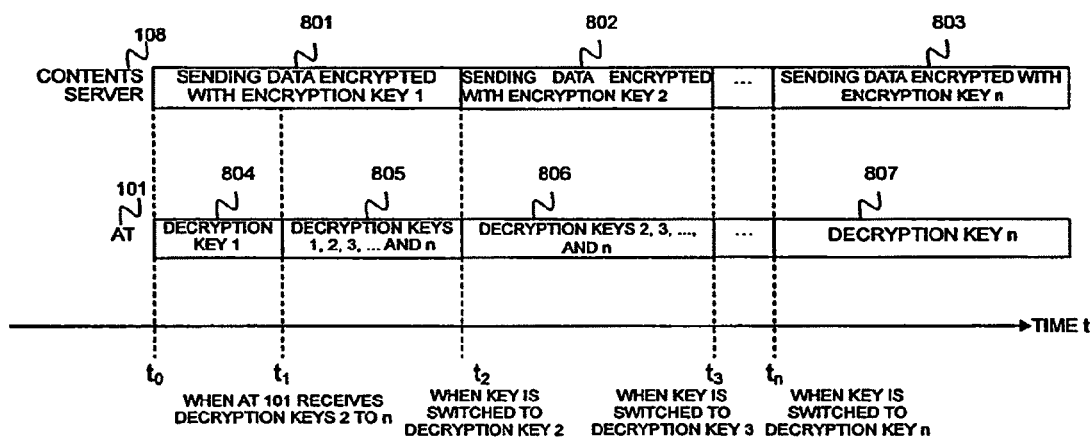
FIG. 8 is a view showing a decryption-key switching method used when three or more decryption keys are sent.

FIG. 8 is a view showing an n-decryption-key switching method. The contents server 108 sends encrypted data. From time t0 to time t2 (when the encryption key 1 is valid), the contents server 108 sends data encrypted with the encryption key 1 (in state 801). Since data is encrypted with the encryption key 1 in this period, it is assumed that the decryption key 1 is necessary to decrypt the data. From time t2 to time t3 (when the encryption key 2 is valid), the contents server 108 sends data encrypted with the encryption key 2 (in state 802). Since data is encrypted with the encryption key 2 in this period, it is assumed that the decryption key 2 is necessary to decrypt the data. From time to or later, the contents server 108 sends data encrypted with the encryption key n (in state 803). Since data is encrypted with the encryption key n, it is assumed that the decryption key n is necessary to decrypt the data.

The AT 101 has the decryption key 1 at time t0, and therefore can decrypt data encrypted with the encryption key 1 and transmitted from the contents server 108 at time 0 (in state 804). The AT 101 needs to obtain the decryption key 2, for example, at time t1, prior to time t2, in order to be able to decrypt data encrypted with the encryption key 2 and transmitted from the contents server 108 at time t2 or later. This figure shows a case in which the decryption keys 2 to n are obtained at the same time at time t1. Therefore, the AT 101 can decrypt data sent from the contents server 108 at a period between time t0 and time t2 by using the decryption key 1, and holds the decryption key 2, to be used to receive data transmitted from time t2 to time t3 in the future, the decryption key 3, to be used after time t3, . . . , and the decryption key n (in step 805). Since it is not necessary to hold the decryption key 1 between time t2 and time t3, the AT 101 has only the decryption keys 2 to n and uses the decryption key 2 to decrypt broadcast data (in state 806). At time to or later, the AT 101 uses the decryption key n to decrypt data encrypted with the encryption key n and transmitted from the contents server 108 (in state 807). The AT 101 also receives decryption keys (n+1), (n+2), . . . to be used after time tn+1, at appropriate timing. The timing may be, for example, a predetermined period before the end time of the valid period of the decryption key n, by referring to the valid periods of keys already sent, stored in the call-control data base 1904 of the PCF 104.

A case where a method for updating the decryption key with time shifts among ATs is used will be described in detail.

The PCF 104 sends an AT paging signal to the terminal a predetermined period before the end time of the valid period of the key already sent in an entry of the call-control data base 1904. In the case shown in FIG. 21, the PCF 104 sends an AT paging signal to the AT corresponding to either (for example, #1) of the mobile-terminal identifiers for which the valid periods end at 10:00, a predetermined period (for example, 30 minutes) before the end time 10:00 of the valid period (corresponding to step 502 in FIG. 5). Then, the terminal is authenticated and a new decryption key (for example, a key "fghijk" having a valid period of 10:00 to 12:00) is sent (corresponding to steps 503 to 510 in FIG. 5). Since the new decryption key has been sent to the terminal corresponding to the mobile-terminal identifier #1, the corresponding already-sent-key valid period is changed to 10:00 to 12:00 in the call-control data base 1904.

Next, the PCF 104 sends an AT paging signal to the AT corresponding to the other (for example, #2) of the mobile-terminal identifiers for which the valid periods end at 10:00 (corresponding to step 502 in FIG. 5). Then, in the same way as described above, the terminal is authenticated and a new decryption key is sent (corresponding to steps 503 to 510 in FIG. 5). Since the new decryption key has been sent to the terminal corresponding to the mobile-terminal identifier #2, the corresponding already-sent-key valid period is changed, for example, to 10:00 to 12:00 in the call-control data base 1904. With this, there is no AT for which the valid period of the key sent ends at 10:00. The PCF 104 finishes key updating that should be performed at that time.

The PCF 104 sends an AT paging signal a predetermined period before the end time 12:00 of a valid period. In the above description, a decryption key is sent one by one. A plurality of decryption keys can be sent in the same way. When a plurality of decryption keys is sent, the corresponding already-sent-key valid period may store the start time of the earliest valid period and the end time of the latest valid period among the valid periods of the plurality of sent keys, or the start time and the end time of the latest valid period.

In this way, an AT paging signal can be sequentially sent to ATs to which decryption keys are to be distributed. In addition, ATs to which new decryption keys have been sent and ATs to which new decryption keys are to be sent can be identified by referring to the already-sent-key valid periods in the call-control data base.

Figure 9:
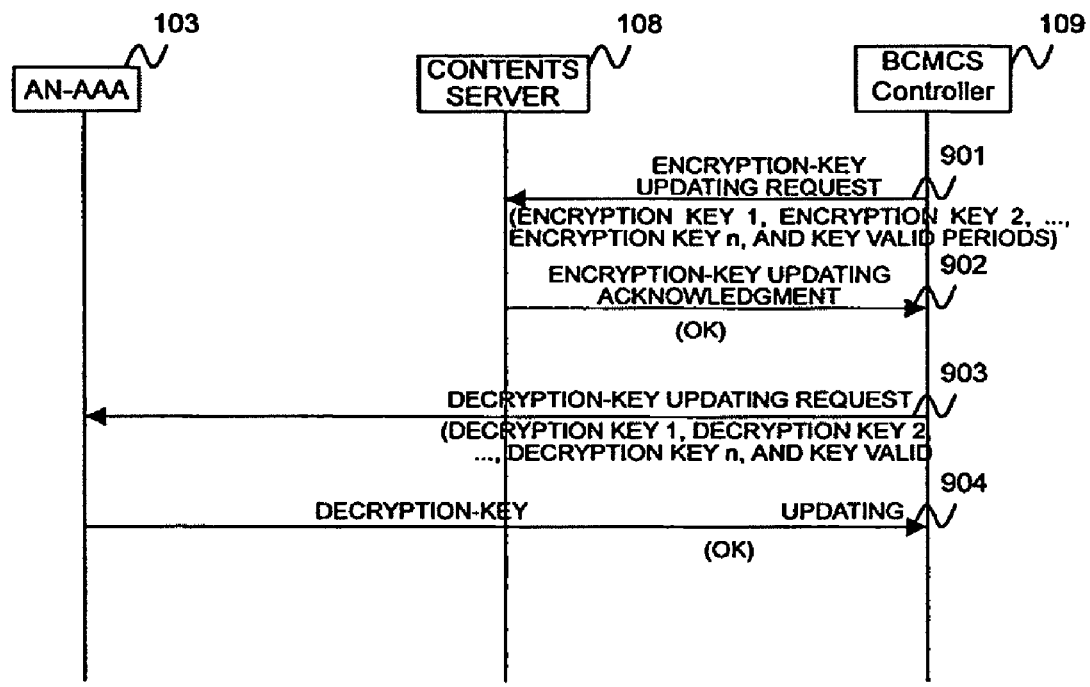
FIG. 9 is a view showing a key-switching-information distribution method used by an AN-AAA.

FIG. 9 shows a procedure for distributing encryption keys used to encrypt broadcast data in the contents server 108 and decryption keys held by the AN-AAA 105 and used by an AT to decrypt broadcast data encrypted by the contents server 108. The BCMCS controller 109 specifies encryption keys used to encrypt broadcast data, decryption keys, and their valid periods. For example, the data shown in FIG. 16 is stored on the encryption-key and decryption-key data base. These keys may be generated automatically, specified automatically, or specified manually.

The BCMCS controller 109 sends an encryption-key updating request to the contents server 108, which encrypts broadcast data, together with the specified encryption keys (in step 901). This request includes, for example, information indicating content types, the encryption keys, and their valid periods. The BCMCS controller 109 can obtain one or a plurality of encryption keys and the valid period of each encryption key by referring to the encryption-key and decryption-key data base 1503. When the contents server 108 successfully receives the information included in the encryption-key updating request, it sends an encryption-key updating acknowledgment to the BCMCS controller 109 to inform that updating has been successfully completed (in step 902). The contents server 108 stores the information in the encryption-key data base 1703.

The BCMCS controller 109 sends a decryption-key updating request to the AN-AAA 105, which manages information to be distributed to ATs, such as decryption keys, together with the specified decryption keys (in step 903). This request includes, for example, information indicating content types, the decryption keys, and their valid periods. The BCMCS controller 109 can obtain one or a plurality of decryption keys, corresponding contents, and the valid period of each encryption key from the encryption-key and decryption-key data base 1503 and send them. When the AN-AAA 105 successfully receives the information included in the decryption-key updating request, it sends an decryption-key updating acknowledgment to the BCMCS controller 109 to inform that updating has been successfully completed (in step 904). The AN-AAA 105 stores the decryption keys and their valid periods in the decryption-key data base 1203 in association with the corresponding content types. The BCMCS controller 109 can send an encryption-key updating request or a decryption-key updating request every time interval specified in advance or every time the encryption-key and decryption-key data base 1503 is updated. The BCMCS controller 109 may send an encryption key or a decryption key in response to a request sent from the AN-AAA 105 or the contents server 108.

The present invention can be used, for example, in industries related to radio communication that allows encrypted data distribution through a broadcast channel.

What is claimed is:

1. A decryption-key distribution method for distributing a decryption key to a radio terminal in a radio communication system, wherein a contents server sends data encrypted with an encryption key, which is received from a control unit managing the encryption key and/or the decryption key, to the radio terminal through a broadcast channel, wherein the radio terminal decrypts the received data with the decryption key corresponding to the encryption key, and wherein a terminal authentication and an authorization for content distribution based on authentication, authorization and accounting (AAA) are performed, the decryption-key distribution method comprising:

storing, in a decryption-key database of an authentication unit, a content type or content identification information, decryption keys, and valid periods of the decryption keys in correspondence with each other, wherein the content type or content identification information, and the corresponding decryption keys and valid periods of the decryption keys are received from the control unit, wherein the authentication unit performs an authentication step of receiving, by the authentication unit, a terminal authentication request message from the radio terminal, the terminal authentication request message including a terminal identifier and an authenticator calculated using the terminal identifier for verifying an adequacy of the radio terminal, and performing the terminal authentication, and wherein if an authenticator obtained according to the terminal identifier matches with the authenticator included in the terminal authentication request message, the authentication unit further performs:

an authorization step of referring to a content registration database to obtain the corresponding content type or content identification information, according to the terminal identifier included in the received terminal authentication request message, wherein the terminal identifier and the content type or content identification information of a content which the radio terminal can receive are stored in advance in correspondence with each other in the content registration database;

a step of referring to the decryption-key database, according to the obtained content type or content identification information, to obtain a specified-in-advance number of the corresponding decryption keys and a specified-in-advance number of valid periods of the decryption keys; and setting, by the authentication unit, the obtained specified-in-advance number of decryption keys and the valid periods of the decryption keys in a terminal authentication response message which is a response to the terminal authentication request message from the radio terminal, and sending the obtained specified-in-advance number of decryption keys and the valid periods of the decryption keys by sending the terminal authentication response message to the radio terminal or to a packet control unit.

2. The decryption-key distribution method according to claim 1, wherein the terminal authentication response message is a message for reporting the authentication result to the radio terminal or the packet control unit, and includes the obtained decryption keys and valid periods of the decryption keys.

3. The decryption-key distribution method according to claim 1, further comprising:

sending to the radio terminal, by the packet control unit, a terminal calling signal to which information indicating that the signal is for authenticating the radio terminal is attached;

sending, by the radio terminal, an authentication request message that includes the terminal identifier to the authentication unit in response to the terminal calling signal received; and authenticating, by the authentication unit, the radio terminal again in response to the received authentication request message, referring, by the authentication unit, to the content registration database and the decryption-key database to obtain a content type or content identification information, one or a plurality of decryption keys whose valid periods are later than the current time, and one or a plurality of valid periods corresponding to the one or the plurality of decryption keys, and sending them to the radio terminal or the packet control unit in an authentication response message.

4. The decryption-key distribution method according to claim 3, wherein the packet control unit sends the terminal calling signal to each radio terminal at different timings.

5. The decryption-key distribution method according to claim 1, further comprising:
  receiving, by the authentication unit, an authentication request message that includes a terminal identifier from a radio terminal which is performing data communication, by using a session established between the radio terminal and a radio base station for data communication; and
  authenticating, by the authentication unit, the radio terminal again in response to the received authentication request message, referring, by the authentication unit, to the content registration database and the decryption-key database to obtain a content type or content identification information, one or a plurality of decryption keys whose valid periods are later than the current time, and one or a plurality of valid periods corresponding to the one or the plurality of decryption keys, and sending them to the radio terminal or the packet control unit in an authentication response message.

6. The decryption-key distribution method according to claim 5,
  wherein the packet control unit sends a message for requesting terminal authentication to each radio terminal at different timings, and
  wherein the authentication request message sent from the radio terminal which is performing data communication, in response to the received message for requesting terminal authentication, is received in the step of receiving, by the authentication unit, the authentication request message that includes the terminal identifier from the radio terminal which is performing the data communication.

7. The decryption-key distribution method according to claim 1, further comprising:
  a first step of sending, by the packet control unit, a terminal calling signal to which is attached information indicating that the signal is for authenticating the radio terminal, to the radio terminal;
  a second step of sending, by the radio terminal, an authentication request message that includes the terminal identifier, to the authentication unit in response to the terminal calling signal received;
  a third step of authenticating, by the authentication unit, the radio terminal again in response to the received authentication request message, referring, by the authentication unit, to the content registration database and the decryption-key database to obtain a content type or content identification information, one or a plurality of decryption keys whose valid periods are later than the current time, and one or a plurality of valid periods corresponding to the one or the plurality of decryption keys, and of sending them to the radio terminal or the packet control unit;
  a fourth step of receiving, by the authentication unit, an authentication request message that includes a terminal identifier from a radio terminal performing data communication, by using a session established between the radio terminal and a radio base station for data communication; and
  a fifth step of authenticating, by the authentication unit, the radio terminal again in response to the received authentication request message, referring to the content registration database and the decryption-key database to obtain a content type or content identification information, one or a plurality of decryption keys whose valid periods are later than the current time, and one or a plurality of valid periods corresponding to the one or the plurality of decryption keys, and sending them to the radio terminal or the packet control unit in an authentication response message,
  wherein the fourth step and the fifth step are executed for the radio terminal performing the data communication, and the first step to the third step are executed for a radio terminal which is not performing the data communication.

8. The decryption-key distribution method according to claim 1,
  wherein, in the step of sending to the radio terminal or the packet control unit, the authentication unit sends the authentication result, the obtained content type or content identification information, and the obtained decryption keys and valid periods of the decryption keys to the packet control unit, and
  wherein the method further comprises:
  a step of sending, by the packet control unit, the received content type or content identification information, the decryption keys and the valid periods of the decryption keys to the radio terminal, and storing the content type or content identification information and the valid periods in a call-control database, in correspondence with a terminal identifier for identifying the radio terminal; and
  a step of sending, by the packet control unit, a terminal calling signal or a message for requesting terminal authentication at a predetermined period before the end time of the valid period stored in the call-control database to the radio terminal indicated by the terminal identifier corresponding to the valid period.

9. The decryption-key distribution method according to claim 8, wherein when there are a plurality of terminal identifiers which are the predetermined period before the end time of the valid period, the packet control unit sends the terminal calling signal or the message for requesting terminal authentication to one of a plurality of corresponding radio terminals, and sends the terminal calling signal or the message for requesting terminal authentication to another radio terminal of the plurality of corresponding radio terminals after a decryption key is distributed to the one of the plurality of corresponding radio terminals or when a predetermined period elapses.

10. An authentication unit in a radio communication system, wherein a contents server sends data encrypted with an encryption key, which is received from a control unit managing the encryption key and/or a decryption key, to a radio terminal through a broadcast channel, wherein the radio terminal decrypts the received data with the decryption key corresponding to the encryption key, and wherein a terminal authentication and an authorization for content distributed based on authentication, authorization and accounting (AAA) are performed, the authentication unit comprising:

a decryption-key database that stores a content type or content identification information, the decryption keys, and the valid periods of the decryption keys in correspondence with each other, the content type or content identification information, the decryption keys, and the valid periods of the decryption keys being received from the control unit;

a content registration database that stores in advance a terminal identifier and the content type or content identification information of a content which the radio terminal can receive, in correspondence with each other; and a processing section for authenticating the radio terminal and distributing the decryption key, wherein when the processing section receives a terminal authentication request message from the radio terminal, the terminal authentication request message including a terminal identifier and an authenticator calculated using the terminal identifier for verifying an adequacy of the radio terminal, the processing section authenticates the radio terminal in response to the received terminal authentication request message, and wherein if an authenticator obtained according to the terminal identifier matches with the authenticator included in the terminal authentication request message, the processing section further:

refers to the content registration database according to the terminal identifier included in the received terminal authentication request message to obtain a corresponding content type or content identification information, refers to the decryption-key database according to the obtained content type or content identification information to obtain a specified-in-advance number of corresponding decryption keys and a specified-in-advance number of valid periods of the decryption keys, and sets the obtained decryption keys and the valid periods of the decryption keys in a terminal authentication response message which is a response to the authentication request message, and sends the obtained specified-in-advance number of decryption keys and the valid periods of the decryption keys by sending the terminal authentication response message to the radio terminal or to a packet control unit.

* * * * *